(12) United States Patent
Zhao

(10) Patent No.: US 10,880,919 B2
(45) Date of Patent: Dec. 29, 2020

(54) METHOD AND DEVICE FOR CONFIGURING AND DETERMINING SEMI-PERSISTENT SCHEDULING

(71) Applicant: China Academy of Telecommunications Technology, Beijing (CN)

(72) Inventor: Yali Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 201 days.

(21) Appl. No.: 16/085,482

(22) PCT Filed: Jan. 4, 2017

(86) PCT No.: PCT/CN2017/070176
§ 371 (c)(1),
(2) Date: Sep. 14, 2018

(87) PCT Pub. No.: WO2017/157089
PCT Pub. Date: Sep. 21, 2017

(65) Prior Publication Data
US 2019/0090266 A1 Mar. 21, 2019

(30) Foreign Application Priority Data

Mar. 15, 2016 (CN) ............ 2016 1 0146530

(51) Int. Cl.
*H04W 72/12* (2009.01)
*H04W 72/04* (2009.01)
*H04W 48/12* (2009.01)

(52) U.S. Cl.
CPC ....... *H04W 72/1289* (2013.01); *H04W 48/12* (2013.01); *H04W 72/04* (2013.01);
(Continued)

(58) Field of Classification Search
CPC ............ H04W 72/1289; H04W 72/04; H04W 72/1205; H04W 72/0453; H04W 72/0446;
(Continued)

(56) References Cited

U.S. PATENT DOCUMENTS

| 2011/0038335 A1 | 2/2011 | Kim et al. |
| 2014/0161069 A1 | 6/2014 | Ohta et al. |
| 2014/0206375 A1 | 7/2014 | Ohta et al. |

FOREIGN PATENT DOCUMENTS

| CN | 101800991 A | 8/2010 |
| CN | 102158932 A | 8/2011 |

(Continued)

*Primary Examiner* — Curtis A Alia
(74) *Attorney, Agent, or Firm* — Foley & Lardner LLP

(57) ABSTRACT

The embodiment of the present application relates to the field of wireless communication technology, and more particularly to a method and a device for configuring and determining semi-persistent scheduling, for solving the problems of resource waste and increased overhead caused by the use of an LTE SPS mode in a V2X communication mode in the prior art. According to the embodiment of the present application, a network side device utilizes the PDCCH signaling scrambled by the SPS C-RNTI, sends the SPS period and/or the SPS frequency domain resource configuration information corresponding to multiple sets of SPS configurations to a terminal. Due to the fact that multiple sets of SPS configurations can be configured to a terminal through the PDCCH signaling, the number of SPS configurations is increased as compared with the background technology in which only one set of SPS configuration can be configured, thereby reducing resource waste and overhead; and the system performance is further improved.

17 Claims, 3 Drawing Sheets

(52) U.S. Cl.
CPC ..... *H04W 72/042* (2013.01); *H04W 72/0446* (2013.01); *H04W 72/0453* (2013.01); *H04W 72/1205* (2013.01)

(58) Field of Classification Search
CPC ........... H04W 72/042; H04W 72/0493; H04W 72/14; H04W 48/12
See application file for complete search history.

(56) References Cited

FOREIGN PATENT DOCUMENTS

| | | |
|---|---|---|
| CN | 102158973 A | 8/2011 |
| CN | 104170491 A | 11/2014 |
| CN | 106304360 A | 1/2017 |
| JP | 2014-528674 A | 10/2014 |
| KR | 20140088126 A | 7/2014 |
| WO | WO-2013/038525 A1 | 3/2013 |
| WO | WO-2013/046468 A1 | 4/2013 |

//

METHOD AND DEVICE FOR CONFIGURING AND DETERMINING SEMI-PERSISTENT SCHEDULING

This application is a US National Stage of International Application No. PCT/CN2017/070176, filed on Jan. 4, 2017, designating the United States and claiming the priority of Chinese Patent Application No. 201610146530.6, filed with the Chinese Patent Office on Mar. 15, 2016, and entitled "A method and device for configuring semi-persistent scheduling and a method and device for determining semi-persistent scheduling configurations". The entire disclosure of each of the applications above is incorporated herein by reference.

FIELD

The present disclosure relates to the field of wireless communications, and particularly to a method and device for configuring semi-persistent scheduling and a method and device for determining semi-persistent scheduling configurations.

BACKGROUND

In order to reduce control signaling overhead, Semi-Persistent Scheduling (SPS) has been introduced into the Long Term Evolution (LTE) system for services characterized by substantially the same size and regular arrival of data packets.

Currently, the LTE system supports two kinds of scheduling: dynamic scheduling and SPS. Dynamic scheduling is applicable to services characterized by irregular sizes and random arrival of data packets, whereas SPS is generally applicable to services characterized by periodic arrival and a fixed size of data packets, e.g., a voice service. In a conventional LTE system, SPS is generally designed for voice services, which is characterized by fixed arriving intervals and substantially fixed sizes of data packets, so only one set of periodically repeated frequency resources needs to be configured when configuring the SPS frequency resources.

Vehicle to Everything (V2X) communication is introduced into LIE Rel-14. V2X communication generally involves the following three aspects: Vehicle to Vehicle (V2V) communication, relating to communication between On Board Units (OBUs); Vehicle to Infrastructure (V2I) communication, relating to communication between a vehicle and a Road Side Unit (RSU); and, Vehicle to Pedestrian (V2P) communication, relating to communication between a vehicle and a pedestrian.

The V2V service is characterized by periodic arrival of data packets (SPS periodicity of 100 ms), but the sizes of the data packets are not substantially fixed-service data packets carrying integral certificates are large, whereas other kinds of data packets are small. Therefore, the service model of the V2V service includes a large packet followed by several small packets, then another large packet followed by several small packets, and so on. If the conventional LTE SPS configuration mode is applied directly to the V2V communication, some frequency resources would be wasted when small packets are transmitted over SPS frequency resources allocated as per the large packets; or, a Scheduling Request (SR)/Buffer Status Report (BSR) request needs to be made to a base station for dynamical scheduling when a large packet is transmitted over SPS frequency resources allocated as per the small packets, since the data of the large packet cannot be transmitted completely over the SPS frequency resources allocated as per the small packets. As such, uplink/downlink overhead would be increased. The other kinds of V2X communication suffer from a similar problem.

In summary, applying the conventional LIE SPS configuration mode to the V2X communication causes wasted resources or increased overhead.

SUMMARY

Embodiments of the disclosure provide a method and device for configuring SPS and a method and device for determining SPS configurations.

In a first aspect, an embodiment of the disclosure provides a method for configuring SPS. The method includes: determining, by a network side device, an SPS Cell Radio Network Temporary Identifier (C-RNTI) corresponding to a plurality of SPS configurations; and transmitting, by the network side device, SPS periodicities corresponding to the plurality of SPS configurations and/or SPS frequency resource configuration information corresponding to the plurality of SPS configurations, to a terminal via one or more Physical Downlink Control Channel (PDCCH) orders scrambled by the SPS C-RNTI.

In an implementation, the network side device transmits the SPS frequency resource configuration information corresponding to the plurality of SPS configurations to the terminal via the one or more PDCCH orders scrambled by the SPS C-RNTI. And before the network side device transmits the SPS frequency resource configuration information corresponding to the plurality of SPS configurations to the terminal via the one or more PDCCH orders scrambled by the SPS C-RNTI, the method further includes: transmitting, by the network side device, the SPS periodicities corresponding to the plurality of SPS configurations to the terminal via one or more Radio Resource Control (RRC) signalings.

In an implementation, transmitting, by the network side device, the SPS periodicities corresponding to the plurality of SPS configurations to the terminal via the one or more RRC signalings includes: when SPS periodicities corresponding to at least two of the plurality of SPS configurations are the same, putting, by the network side device, the same SPS periodicity in one of the one or more RRC signalings.

In an implementation, SPS periodicities corresponding to all or a part of the SPS configurations are the same. And before the network side device transmits the SPS periodicities corresponding to the plurality of SPS configurations to the terminal via the one or more PDCCH orders scrambled by the SPS C-RNTI, the method further includes: putting, by the network side device, the same SPS periodicity in one of the one or more PDCCH orders.

In an implementation, some of the SPS periodicities corresponding to the plurality of SPS configurations are different. And before the network side device transmits the SPS frequency resource configuration information corresponding to the plurality of SPS configurations to the terminal, the method further includes: putting, by the network side device, correspondence relationships between SPS periodicities and the SPS frequency resource configuration information in the one or more PDCCH orders.

In an implementation, SPS frequency resource configuration information corresponding to a part of or all of the SPS configurations is the same. And before the network side device transmits the SPS frequency resource configuration information corresponding to the plurality of SPS configurations to the terminal via the one or more PDCCH orders scrambled by the SPS C-RNTI, the method further includes: putting, by the network side device, the same SPS frequency resource configuration information in one of the one or more PDCCH orders.

In an implementation, before the network side device transmits the SPS frequency resource configuration information corresponding to the plurality of SPS configurations to the terminal, the method further includes: putting, by the network side device, SPS configuration index information in the one or more PDCCH orders, where each SPS configuration index corresponds to one SPS configuration.

In an implementation, transmitting, by the network side device, the SPS frequency resource configuration information corresponding to the plurality of SPS configurations to the terminal further includes: for each of the plurality of SPS configurations: adding, by the network side device, a temporal offset of an SPS frequency resource corresponding to the SPS configuration into a PDCCH order carrying SPS frequency resource configuration information corresponding to the SPS configuration, where the temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, after the network side device transmits the SPS frequency resource configuration information corresponding to the plurality of SPS configurations to the terminal, the method further includes: releasing, by the network side device, the plurality of SPS configurations configured for the terminal, via at least one PDCCH order scrambled by the SPS C-RNTI.

In an implementation, the plurality of SPS configurations are uplink SPS configurations, And after the network side device transmits the SPS frequency resource configuration information corresponding to the plurality of SPS configurations to the terminal, the method further includes: for each of the plurality of SPS configurations: releasing, by the network side device, the SPS configuration upon reception of N consecutive padding Buffer Status Reports (BSRs) having no data parts over a resource corresponding to the SPS configuration.

In an implementation, after the network side device transmits the SPS frequency resource configuration information corresponding to the plurality of SPS configurations to the terminal, the method further includes: determining, by the network side device, the plurality of SPS configurations as SPS configurations to be used by the terminal when the plurality of SPS configurations do not overlap in a time domain; or, determining, by the network side device, an SPS configuration to be used by the terminal, from the plurality of SPS configurations according to a preset selection criterion, when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In a second aspect, an embodiment of the disclosure provides a method for determining SPS configurations. The method includes: determining, by a terminal, an SPS C-RNTI corresponding to a plurality of SPS configurations; receiving, by the terminal, one or more PDCCH orders scrambled by the SPS C-RNTI, from a network side device; determining, by the terminal, SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI; and, determining, by the terminal, the plurality of SPS configurations according to the determined information corresponding to the plurality of SPS configurations.

In an implementation, the terminal determines the SPS frequency resource configuration information corresponding to the plurality of SPS configurations configured by the network side device for the terminal, according to the one or more PDCCH orders scrambled by the SPS C-RNTI. And before the terminal determines the plurality of SPS configurations according to the determined information, the method further includes: determining, by the terminal, the SPS periodicities corresponding to the plurality of SPS configurations configured by the network side device for the terminal, via one or more RRC signalings.

In an implementation, after the terminal determines the plurality of SPS configurations, the method further includes: determining, by the terminal, the plurality of SPS configurations as SPS configurations to be used by the terminal when the plurality of SPS configurations do not overlap in a time domain; or, determining, by the terminal, art SPS configuration to be used by the terminal, from the plurality of SPS configurations according to a preset selection criterion when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In an implementation, the plurality of SPS configurations are uplink SPS configurations. And after the terminal determines the plurality of SPS configurations, the method further includes: for each of the plurality of SPS configurations: transmitting, by the terminal, N consecutive padding BSRs having no data parts to the network side device over a resource of the SPS configuration to instruct the network side device to release the SPS configuration.

In a third aspect, an embodiment of the disclosure provides a network side device for configuring semi-persistent scheduling. The network side device includes: a first identifier determining module configured to determine an SPS C-RNTI corresponding to a plurality of SPS configurations, and a processing module configured to transmit SPS periodicities corresponding to the plurality of SPS configurations and/or SPS frequency resource configuration information corresponding to the plurality of SPS configurations, to a terminal via one or more PDCCH orders scrambled by the SPS C-RNTI.

In an implementation, when the processing module transmits the SPS frequency resource configuration information corresponding to the plurality of SPS configurations to the terminal via the one or more PDCCH orders scrambled by the SPS C-RNTI, the processing module is further configured to transmit the SPS periodicities corresponding to the plurality of SPS configurations to the terminal via one or more RRC signalings, before transmitting the SPS frequency resource configuration information corresponding to the plurality of SPS configurations to the terminal via the one or more PDCCH orders scrambled by the SPS C-RNTI.

In an implementation, the processing module is further configured to: when SPS periodicities corresponding to at least two of the plurality of SPS configurations are the same, put the same SPS periodicity in one of the one or more RRC signalings.

In an implementation, SPS periodicities corresponding to all or a part of the SPS configurations are the same. And the processing module is further configured to put the same SPS periodicity in one of the one or more PDCCH orders, before transmitting the SPS periodicities corresponding to the plurality of SPS configurations to the terminal via the one or more PDCCH orders scrambled by the SPS C-RNTI.

In an implementation, some of the SPS periodicities corresponding to the plurality of SPS configurations are different. And the processing module is further configured to put correspondence relationships between SPS periodicities and the SPS frequency resource configuration information in the one or more PDCCH orders before transmitting the SPS frequency resource configuration information corresponding to the plurality of SPS configurations to the terminal.

In an implementation, SPS frequency resource configuration information corresponding to a part of or all of the SPS configurations is the same. And the processing module is further configured to put the same SPS frequency resource configuration information in one of the one or more PDCCH orders before transmitting the SPS frequency resource configuration information corresponding to the plurality of SPS configurations to the terminal via the one or more PDCCH orders scrambled by the SPS C-RNTI.

In an implementation, the processing module is further configured to put SPS configuration index information in the one or more PDCCH orders before transmitting the SPS frequency resource configuration information corresponding to the plurality of SPS configurations to the terminal, where each SPS configuration index corresponds to one SPS configuration.

In an implementation, the processing module is further configured to: for each of the plurality of SPS configurations: add a temporal offset of an SPS frequency resource corresponding to the SPS configuration into a PDCCH order carrying SPS frequency resource configuration information corresponding to the SPS configuration, where the temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, the processing module is further configured to: release the plurality of SPS configurations configured for the terminal, via at least one PDCCH order scrambled by the SPS C-RNTI after transmitting the SPS frequency resource configuration information corresponding to the plurality of SPS configurations to the terminal.

In an implementation, the plurality of SPS configurations are uplink SPS configurations. And the processing module is further configured to: for each of the plurality of SPS configurations: release the SPS configuration upon reception of N consecutive padding BSRs having no data parts over a resource corresponding to the SPS configuration, after transmitting the SPS frequency resource configuration information corresponding to the plurality of SPS configurations to the terminal.

In an implementation, the processing module is further configured to: determine the plurality of SPS configurations as SPS configurations to be used by the terminal when the plurality of SPS configurations do not overlap in a time domain; or, determine an SPS configuration to be used by the terminal, from the plurality of SPS configurations according to a preset selection criterion, when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In a fourth aspect, an embodiment of the disclosure provides a terminal for determining semi-persistent scheduling configurations. The terminal includes: a second identifier determining module configured to determine an SPS C-RNTI corresponding to a plurality of SPS configurations; a receiving module configured to receive one or more PDCCH orders scrambled by the SPS C-RNTI, from a network side device; and, a configuration determining module configured to: determine SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determine the plurality of SPS configurations according to the determined information corresponding to the plurality of SPS configurations.

In an implementation, the configuration determining module is further configured to determine the SPS periodicities corresponding to the plurality of SPS configurations configured by the network side device for the terminal, via one or more RRC signalings before determining the plurality of SPS configurations according to the determined information, when determining the SPS frequency resource configuration information corresponding to the plurality of SPS configurations configured by the network side device for the terminal, according to the one or more PDCCH orders scrambled by the SPS C-RNTI.

In an implementation, the configuration determining module is further configured to: determine the plurality of SPS configurations as SPS configurations to be used by the terminal when the plurality of SPS configurations do not overlap in a time domain; or, determine, an SPS configuration to be used by the terminal, from the plurality of SPS configurations according to a preset selection criterion when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In an implementation, the plurality of SPS configurations are uplink SPS configurations. And after the terminal determines the plurality of SPS configurations, the configuration determining module is further configured to: for each of the plurality of SPS configurations: transmit N consecutive padding BSRs having no data parts to the network side device over a resource of the SPS configuration to instruct the network side device to release the SPS configuration.

In a fifth aspect, an embodiment of the disclosure provides a network side device for configuring semi-persistent scheduling. The network side device includes a processor, a memory, and a transceiver. The processor is configured to read instructions in the memory to: determine an SPS C-RNTI corresponding to a plurality of SPS configurations, and control the transceiver to transmit SPS periodicities corresponding to the plurality of SPS configurations and/or SPS frequency resource configuration information corresponding to the plurality of SPS configurations, to a terminal via one or more PDCCH orders scrambled by the SPS The transceiver is configured to receive and transmit data under the control of the processor.

In an implementation, when the processor controls the transceiver to transmit the SPS frequency resource configuration information corresponding to the plurality of SPS configurations to the terminal via the one or more PDCCH orders scrambled by the SPS C-RNTI, the processor is further configured to control the transceiver to transmit the SPS periodicities corresponding to the plurality of SPS configurations to the terminal via one or more RRC signalings, before controlling the transceiver to transmit the SPS frequency resource configuration information corresponding to the plurality of SPS configurations to the terminal via the one or more PDCCH orders scrambled by the SPS C-RNTI.

In an implementation, when SPS periodicities corresponding to at least two of the plurality of SPS configurations are the same, the processor is further configured to put the same SPS periodicity in one of the one or more RRC signalings.

In an implementation, SPS periodicities corresponding to all or a part of the SPS configurations are the same. And the processor is further configured to put the same SPS periodicity in one of the one or more PDCCH orders, before transmitting the SPS periodicities corresponding to the plurality of SPS configurations to the terminal via the one or more PDCCH orders scrambled by the SPS C-RNTI.

In an implementation, some of the SPS periodicities corresponding to the plurality of SPS configurations are different. The processor is further configured to put correspondence relationships between SPS periodicities and the SPS frequency resource configuration information in the one or more PDCCH orders before controlling the transceiver to transmit the SPS frequency resource configuration information corresponding to the plurality of SPS configurations to the terminal.

In an implementation, SPS frequency resource configuration information corresponding to a part of or all of the SPS configurations is the same. And the processor is further configured to put the same SPS frequency resource configuration information in one of the one or more PDCCH orders before controlling the transceiver to transmit the SPS frequency resource configuration information corresponding to the plurality of SPS configurations to the terminal via the one or more PDCCH orders scrambled by the SPS C-RNTI.

In an implementation, the processor is further configured to put SPS configuration index information in the one or more PDCCH orders before controlling the transceiver to transmit the SPS frequency resource configuration information corresponding to the plurality of SPS configurations to the terminal, where each SPS configuration index corresponds to one SPS configuration.

In an implementation, the processor is further configured to: for each of the plurality of SPS configurations: add a temporal offset of an SPS frequency resource corresponding to the SPS configuration into a PDCCH order carrying SPS frequency resource configuration information corresponding to the SPS configuration. The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, the processor is further configured to release the plurality of SPS configurations configured for the terminal, via at least one PDCCH order scrambled by the SPS C-RNTI after controlling the transceiver to transmit the SPS frequency resource configuration information corresponding to the plurality of SPS configurations to the terminal.

In an implementation, the plurality of SPS configurations are uplink SPS configurations. And the processor is further configured to: for each of the plurality of SPS configurations: release the SPS configuration upon reception of N consecutive padding BSRs having no data parts over a resource corresponding to the SPS configuration, after controlling the transceiver to transmit the SPS frequency resource configuration information corresponding to the plurality of SPS configurations to the terminal.

In an implementation, the processor is further configured to: determine the plurality of SPS configurations as SPS configurations to be used by the terminal when the plurality of SPS configurations do not overlap in a time domain; or, determine an SPS configuration to be used by the terminal, from the plurality of SPS configurations according to a preset selection criterion, when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In a sixth aspect, an embodiment of the disclosure provides a terminal for determining semi-persistent scheduling. The terminal includes a processor, a memory, and a transceiver. the processor is configured to read instructions in the memory to: determine an SPS C-RNTI corresponding to a plurality of SPS configurations, control the transceiver to receive one or more PDCCH orders scrambled by the SPS C-RNTI, from a network side device, determine SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determine the plurality of SPS configurations according to the determined information corresponding to the plurality of SPS configurations. The transceiver is configured to receive and transmit data under the control of the processor.

In an implementation, the processor is further configured to determine the SPS periodicities corresponding to the plurality of SPS configurations configured by the network side device for the terminal, via one or more RRC signalings before determining the plurality of SPS configurations according to the determined information, when determining the SPS frequency resource configuration information corresponding to the plurality of SPS configurations configured by the network side device for the terminal, according to the one or more PDCCH orders scrambled by the SPS C-RNTI.

In an implementation, the processor is further configured to: determine the plurality of SPS configurations as SPS configurations to be used by the terminal when the plurality of SPS configurations do not overlap in a time domain; or, determine, an SPS configuration to be used by the terminal, from the plurality of SPS configurations according to a preset selection criterion when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In an implementation, the plurality of SPS configurations are uplink SPS configurations. And after the terminal determines the plurality of SPS configurations, the processor is further configured to: for each of the plurality of SPS configurations: transmit N consecutive padding BSRs having no data parts to the network side device over a resource of the SPS configuration to instruct the network side device to release the SPS configuration.

BRIEF DESCRIPTION OF THE DRAWINGS

In order to make the technical solutions according to the embodiments of the disclosure clearer, the drawings to which a description of the embodiments refers will be briefly introduced below. Apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

In the embodiments of the disclosure, the network side device transmits the SPS periodicities and/or the SPS frequency resource configuration information corresponding to the plurality of SPS configurations to the terminal via the one or more PDCCH orders scrambled by the SPS C-RNTI. Since the terminal can be configured with the plurality of SPS configurations via the one or more PDCCH orders, the number of SPS configurations can be increased as compared with the existing technology in which only one SPS configuration can be configured, thereby reducing wasted resources or overhead and improving the performance of the system.

In the embodiments of the disclosure, the network side device transmits the plurality of SPS configurations to the terminal, and the terminal determines the plurality of SPS configurations configured by the network side device.

If the SPS configurations are uplink SPS configurations, then the terminal selects an SPS configuration to be used by the terminal from the plurality of SPS configurations, and transmits data to the network side device via the SPS configuration to be used by the terminal. Correspondingly, if the network side device can determine an SPS configuration used by the terminal, then it may detect the SPS configuration used by the terminal, otherwise if it cannot determine the SPS configuration used by the terminal, then it detects resources corresponding to the plurality of SPS configurations.

If the SPS configurations are downlink SPS configurations, then the network side device selects an SPS configuration to be used by the terminal from the plurality of SPS configurations, and transmits data to the terminal via the SPS configuration to be used by the terminal. Correspondingly, if the terminal can determine an SPS configuration used by the network side device, then it may detect the SPS configuration used by the network side device, otherwise if it cannot determine the SPS configuration used by the network side device, then it detects resources corresponding to the plurality of SPS configurations.

In order to make the objects, technical solutions, and advantages of the embodiments of the disclosure clearer, the technical solutions according to the embodiments of the disclosure will be described below clearly and fully with reference to the drawings in the embodiments of the disclosure. Apparently the embodiments described below are only a part but not all of the embodiments of the disclosure. Based upon the embodiments described herein, all the other embodiments which can occur to those skilled in the art without any inventive effort shall fall into the scope of the disclosure.

Figure 1:
FIG. 1 is a schematic structural diagram of a system for configuring semi-persistent scheduling according to an embodiment of the disclosure.

As illustrated in FIG. 1, a system for configuring semi-persistent scheduling according to an embodiment of the disclosure includes a network side device 10 and a terminal 20.

The network side device 10 is configured to: determine an SPS C-RNTI corresponding to a plurality of SPS configurations, and transmit SPS periodicities corresponding to the plurality of SPS configurations and/or SPS frequency resource configuration information corresponding to the plurality of SPS configurations, to the terminal 20 via one or more PDCCH orders scrambled by the SPS C-RNTI.

The terminal 20 is configured to: determine an SPS C-RNTI corresponding to a plurality of SPS configurations, receive one or more PDCCH orders scrambled by the SPS C-RNTI, from a network side device, determine SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determine the plurality of SPS configurations according to the determined information corresponding to the plurality of SPS configurations.

In the embodiments of the disclosure, configuring the terminal with the SPS might be implemented by: 1) configuring the SPS periodicities via the one or more PDCCH orders; 2) configuring the SPS frequency resource configuration information via the one or more PDCCH orders; or 3) configuring both the SPS periodicities and the SPS frequency resource configuration information via the one or more PDCCH orders.

In an embodiment of the disclosure, the plurality of SPS configurations, which when the network side device configures the terminal with, include both the SPS periodicities and the SPS frequency resource configuration information, corresponding to the plurality of SPS configurations.

Since the SPS periodicities corresponding to the plurality of SPS configurations might be different, and/or, the different SPS frequency resources corresponding to the plurality of SPS configurations might be different, configuration processes might be different as well. Different configuration processes are introduced below, respectively.

In a first case, a part of or all of the SPS periodicities are the same, whereas every two of the SPS frequency resources are different from each other.

1. If all the SPS periodicities are the same, then only one SPS periodicity is transmitted to the terminal.

1) The SPS periodicity is transmitted via a RRC signaling.

The network side device can place the SPS periodicity in the RRC signaling, and transmit the RRC signaling to the terminal. The RRC signaling includes the SPS C-RNTI corresponding to a service.

Correspondingly, after the terminal receives the RRC signaling, if the RRC signaling includes one SPS periodicity, then the terminal determines that the SPS periodicities corresponding to the plurality of SPS configurations of the service are the same, and equal to the SPS periodicity in the RRC signaling.

When transmitting the SPS frequency resources, the network side device can put all the SPS frequency resource configuration information in a PDCCH order, or put a different piece of SPS frequency resource configuration information in a different PDCCH order.

Correspondingly, after the terminal receives the one or more PDCCH orders, it combines the SPS frequency resource configuration information in the one or more PDCCH orders with the SPS periodicity in the RRC signaling to determine the each of the plurality of SPS configurations.

2) The SPS periodicity is transmitted via the one or more PDCCH orders.

When transmitting the SPS frequency resources, the network side device can put all the plurality of different pieces of SPS frequency resource configuration information in a PDCCH order, or, put a different piece of SPS frequency resource configuration information in a different PDCCH order.

The network side device places the SPS frequency resource configuration information and the SPS periodicity in the one or more PDCCH orders scrambled by the SPS C-INTI, and transmits the one or more PDCCH orders to the terminal.

Correspondingly, after the terminal receives a PDCCH order, if the PDCCH order carries one SPS periodicity and the plurality of different pieces of SPS frequency resource configuration information, then the terminal combines each of the plurality of pieces of SPS frequency resource configuration information with the SPS periodicity, respectively; or, if the PDCCH order carries one SPS periodicity and one piece of SPS frequency resource configuration information, then the terminal combines the piece of SPS frequency resource configuration information with the SPS periodicity both in the PDCCH order.

In an implementation, the network side device puts SPS configuration index information in the one or more PDCCH orders to indicate a plurality of SPS configuration indexes corresponding to the plurality of SPS configurations.

For example, the SPS configuration index can have N bits. The value of N depends on the number of SPS configurations of the service. For example, if the service needs two SPS configurations, then the value of N may be in two bits, where 00 identifies a first SPS configuration, 01 identifies a reconfiguration of the first SPS configuration, 10 identifies the second SPS configuration, and 11 identifies a reconfiguration of the second SPS configuration.

In an implementation, for one of the plurality of SPS configurations, the network side device adds a temporal offset of an SPS frequency resource corresponding to the SPS configuration into the PDCCH order carrying SPS frequency resource configuration information corresponding to the SPS configuration.

The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received. For example, if the terminal receives the PDCCH order scrambled by the SPS C-RNTI in a sub-frame n, where the PDCCH order carries a temporal offset m, then the SPS frequency resource carried by the PDCCH order is validated from a sub-frame n+m.

2. If a part of (not all of) the SPS periodicities are the same, then the network side device transmits only one of the same SPS periodicities to the terminal, and transmits the remaining different SPS periodicities to the terminal, respectively.

1) The SPS periodicities are transmitted via one or more RRC signalings.

In an implementation, the network side device can place the SPS periodicities in the one or more RRC signalings each including the SPS C-RNTI corresponding to the service, and transmit the one or more RRC signalings to the terminal (only one of the same SPS periodicities is transmitted).

Correspondingly, the terminal determines that all the SPS periodicities in the one or more RRC signalings correspond to the same service, upon reception of the one or more RRC signalings.

In an implementation, when transmitting the SPS frequency resources, the network side device can put all the plurality of different pieces of SPS frequency resource configuration information in a PDCCH order, or can put a different piece of SPS frequency resource configuration information in a different PDCCH order.

If all the plurality of different pieces of SPS frequency resource configuration information is carried by one PDCCH order, then the network side device may place the plurality of different pieces of SPS frequency resource configuration information in the PDCCH order scrambled by the SPS C-RNTI, and put correspondence relationships between the SPS periodicities and the plurality of different pieces of SPS frequency resource configuration information in the PDCCH order.

Correspondingly, after the terminal receives the PDCCH order, the terminal can know which piece of the plurality of different pieces of SPS frequency resource configuration information in the PDCCH order corresponds to which one of the SPS periodicities in the one or more RRC signalings, according to the correspondence relationships between the SPS periodicities and the plurality of different pieces of SPS frequency resource configuration information in the PDCCH order scrambled by the SPS C-RNTI.

If a different piece of SPS frequency resource configuration information is carried by a different PDCCH order, then the network side device may place the different piece of SPS frequency resource configuration information in the different PDCCH order scrambled by the SPS C-RNTI, and put a correspondence relationship between one of the SPS periodicities and the different piece of SPS frequency resource configuration information in the different PDCCH order scrambled by the SPS C-RNTI.

Correspondingly, after the terminal receives the different PDCCH order, it can know that the different piece of SPS frequency resource configuration information in the different PDCCH order corresponds to which one of the SPS periodicities in the one or more RRC signalings, according to the correspondence relationship between one of the SPS periodicities and the different piece of SPS frequency resource configuration information, carried by the different PDCCH order scrambled by the SPS C-RNTI.

2) The SPS periodicities are transmitted in the one or more PDCCH orders.

In an implementation, when transmitting the SPS frequency resources, the network side device can put all the plurality of different pieces of SPS frequency resource configuration information in one PDCCH order, or can put a different piece of SPS frequency resource configuration information in a different PDCCH order.

If all plurality of different pieces of the SPS frequency resource configuration information is carried by one PDCCH order, then the network side device may place the plurality of different pieces of SPS frequency resource configuration information and all the SPS periodicities in the PDCCH order scrambled by the SPS C-RNTI, and put the correspondence relationships between the SPS periodicities and the plurality of different pieces of SPS frequency resource configuration information in the PDCCH order.

Correspondingly, after the terminal receives the PDCCH order, the terminal can know which piece of the plurality of different pieces of SPS frequency resource configuration information corresponds to which one of the SPS periodicities in the PDCCH order, according to the correspondence relationships between the SPS periodicities and the plurality of different pieces of SPS frequency resource configuration information in the PDCCH order scrambled by the SPS C-RNTI.

If a different piece of SPS frequency resource configuration information is carried by a different PDCCH order, then the network side device may place both the different SPS frequency resource configuration information and an SPS periodicity corresponding to the different piece of SPS frequency resource configuration information into the different PDCCH order scrambled by the SPS C-RNTI.

Correspondingly, the terminal can know that the different piece of SPS frequency resource configuration information in the different PDCCH order corresponds to the SPS periodicity in the different PDCCH order upon reception of the different PDCCH order.

In an implementation, the network side device can further put SPS configuration index information in the one or more PDCCH orders to indicate a plurality of SPS configuration indexes corresponding to the plurality of SPS configurations.

For example, the SPS configuration index can be N bits. The value of N is determined by the number of SPS configurations of the service. For example, if the service needs two SPS configurations, then the value of N may be in two bits, where 00 identifies a first SPS configuration, 01 identifies a reconfiguration of the first SPS configuration, 10 identifies the second SPS configuration, and 11 identifies a reconfiguration of the second SPS configuration.

In an implementation, for one of the plurality of SPS configurations, the network side device adds a temporal offset of an SPS frequency resource corresponding to the SPS configuration into a PDCCH order carrying a piece of SPS frequency resource configuration information corresponding to the SPS configuration.

The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In a second case, every two of the SPS periodicities are different from each other, whereas a part of or all of the SPS frequency resources are the same.

1. All the SPS frequency resources are the same.

1) The SPS periodicities are transmitted via one or more RRC signalings.

In an implementation, the network side device can place the SPS periodicities in the one or more RRC signalings each including the SPS C-RNTI corresponding to the service, and transmit the one or more RRC signalings to the terminal.

Correspondingly, the terminal can know that all the SPS periodicities in the one or more RRC signalings correspond to the same service.

Since all the SPS frequency resources are the same, the network side device only needs to configure the terminal with one piece of SPS frequency resource configuration information.

The network side device can place the piece of SPS frequency resource configuration information in one PDCCH order, and scramble the PDCCH order by the SPS C-RNTI.

Correspondingly, after the terminal receives the PDCCH order scrambled by the SPS C-RNTI, if the PDCCH order includes a piece of SPS frequency resource configuration information, then the terminal can know that all the SPS frequency resource configuration information corresponding to the service is the same, and blind the SPS frequency resource configuration information with each SPS periodicity in the one or more RRC signalings, respectively, to determine each SPS configuration.

2) The SPS periodicities are transmitted via one PDCCH order.

Since all the SPS frequency resources are the same, the network side device only needs to configure the terminal with one piece of SPS frequency resource configuration information.

The network side device can place both the piece of SPS frequency resource configuration information and all the SPS periodicities into the PDCCH order, and scramble the PDCCH order by the SPS C-RNTI.

Correspondingly, after the terminal receives the PDCCH order scrambled by the SPS C-RNTI, if the PDCCH order includes a piece of SPS frequency resource configuration information, then the terminal can know that all the SPS frequency resource configuration information corresponding to the service is the same, and blind the SPS frequency resource configuration information with each SPS periodicity in the PDCCH order, respectively, to determine each SPS configuration.

In an implementation, the network side device puts SPS configuration index information in the PDCCH order to indicate a plurality of SPS configuration indexes corresponding to the plurality of SPS configurations.

For example, the SPS configuration index can have N bits. The value of N depends on the number of SPS configurations of the service. For example, if the service needs two SPS configurations, then the value of N may be in two bits, where 00 identifies a first SPS configuration, 01 identifies a reconfiguration of the first SPS configuration, 10 identifies the second SPS configuration, and 11 identifies a reconfiguration of the second SPS configuration.

In an implementation, for one of the plurality of SPS configurations, the network side device adds a temporal offset of an SPS frequency resource corresponding to the SPS configuration into the PDCCH order carrying SPS frequency resource configuration information corresponding to the SPS configuration.

The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

2. If a part of (not all of) the SPS frequency resources are the same, then the network side device transmits only one piece of the same SPS frequency resource configuration information and the different SPS periodicities to the terminal.

1) The SPS periodicities are transmitted via one or more RRC signalings.

In an implementation, the network side device can place the SPS periodicities in the one or more RRC signalings each including the SPS C-RNTI corresponding to the service, and transmit the one or more RRC signalings to the terminal.

Correspondingly, the terminal determines that all the SPS periodicities in the one or more RRC signalings correspond to the same service, upon reception of the one or more RRC signalings.

In an implementation, when transmitting the SPS frequency resources, the network side device can put all the SPS frequency resource configuration information in a PDCCH order, or can put a different piece of SPS frequency resource configuration information in a different PDCCH order.

If all the SPS frequency resource configuration information is carried by a PDCCH order, then the network side device may place all the SPS frequency resource configuration information in the PDCCH order scrambled by the SPS C-RNTI, and put correspondence relationships between the SPS periodicities and all the SPS frequency resource configuration information in the PDCCH order.

Correspondingly, after the terminal receives the PDCCH order, the terminal can know which piece of all the SPS frequency resource configuration information in the PDCCH order corresponds to which one of the SPS periodicities in the one or more RRC signalings, according to the correspondence relationships between the SPS periodicities and all the SPS frequency resource configuration information, in the PDCCH order scrambled by the SPS C-RNTI.

If a different piece of SPS frequency resource configuration information is carried in a different PDCCH order, then the network side device may place different piece of SPS frequency resource configuration information in the different PDCCH order scrambled by the SPS C-RNTI, and put a correspondence relationship between one of the SPS periodicities and the different piece of SPS frequency resource configuration information in the different PDCCH order scrambled by the SPS C-RNTI.

Correspondingly, after the terminal receives the different PDCCH order, it can know that the different piece of SPS frequency resource configuration information in the different PDCCH order corresponds to which one of the SPS periodicities in the one or more RRC signalings, according to the correspondence relationship between one of the SPS periodicities and the different piece of SPS frequency resource configuration information, carried by the different PDCCH order scrambled by the SPS 2) The SPS periodicities are transmitted in the one or more PDCCH orders.

In an implementation, when transmitting the SPS frequency resources, the network side device can put all the SPS frequency resource configuration information in a PDCCH order, or can put a different piece of SPS frequency resource configuration information in a different PDCCH order.

If all the SPS frequency resource configuration information is carried by a PDCCH order, then the network side device may place all the SPS frequency resource configuration information and all the SPS periodicities in the PDCCH order scrambled by the SPS C-RNTI, and put the correspondence relationships between the SPS periodicities and all the SPS frequency resource configuration information in the PDCCH order.

Correspondingly, after the terminal receives the PDCCH order, the terminal can know which of all the SPS frequency resource configuration information corresponds to which one of the SPS periodicities in the PDCCH order, according to the correspondence relationships between the SPS periodicities and all the SPS frequency resource configuration information in the PDCCH order scrambled by the SPS C-RNTI.

If a different piece of SPS frequency resource configuration information is carried by a different PDCCH order, then the network side device may place both the different SPS frequency resource configuration information and an SPS periodicity corresponding to the different piece of SPS frequency resource configuration information into the different PDCCH order scrambled by the SPS C-RNTI.

Correspondingly, the terminal can know that the different piece of SPS frequency resource configuration information in the different PDCCH order corresponds to the SPS periodicity in the different PDCCH order upon reception of the different PDCCH order.

In an implementation, the network side device can further put SPS configuration index information in the one or more PDCCH orders to indicate each SPS configuration index corresponding to each of the plurality of SPS configurations.

For example, the SPS configuration index can be N bits. The value of N is determined by the number of SPS configurations of the service. For example, if the service needs two SPS configurations, then the value of N may be in two bits, where 00 identifies a first SPS configuration, 01 identifies a reconfiguration of the first SPS configuration, 10 identifies the second SPS configuration, and 11 identifies a reconfiguration of the second SPS configuration.

In an implementation, for one of the plurality of SPS configurations, the network side device adds a temporal offset of an SPS frequency resource corresponding to the SPS configuration into a PDCCH order carrying a piece of SPS frequency resource configuration information corresponding to the SPS configuration.

The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In a third case, every two of the SPS periodicities are different from each other, and every two of the SPS frequency resources are different from each other.

1) The SPS periodicities are transmitted via one or more RRC signalings.

In an implementation, the network side device can place the SPS periodicities in the one or more RRC signalings each including the SPS C-RNTI corresponding to the service, and transmit the one or more RRC signalings to the terminal.

Correspondingly, the terminal can know that all the SPS periodicities in the one or more RRC signalings correspond to the same service.

In an implementation, when transmitting the SPS frequency resources, the network side device can put all the SPS frequency resource configuration information in a PDCCH order, or can put a different piece of SPS frequency resource configuration information in a different PDCCH order.

If all the SPS frequency resource configuration information is carried by a PDCCH order, then the network side device may place all the SPS frequency resource configuration information in the PDCCH order scrambled by the SPS C-RNTI, and put correspondence relationships between the SPS periodicities and all the SPS frequency resource configuration information in the PDCCH order.

Correspondingly, after the terminal receives the PDCCH order, the terminal can know which piece of all the SPS frequency resource configuration information in the PDCCH order corresponds to which one of the SPS periodicities in the one or more RRC signalings, according to the correspondence relationships between the SPS periodicities and all the SPS frequency resource configuration information, in the PDCCH order scrambled by the SPS C-RNTI.

If a different piece of SPS frequency resource configuration information is carried in a different PDCCH order, then the network side device may place different piece of SPS frequency resource configuration information in the different PDCCH order scrambled by the SPS C-RNTI, and put a correspondence relationship between one of the SPS periodicities and the different piece of SPS frequency resource configuration information in the different PDCCH order scrambled by the SPS C-RNTI.

Correspondingly, after the terminal receives the different PDCCH order, it can know that the different piece of SPS frequency resource configuration information in the different PDCCH order corresponds to which one of the SPS periodicities in the one or more RRC signalings, according to the correspondence relationship between one of the SPS periodicities and the different piece of SPS frequency resource configuration information, carried by the different PDCCH order scrambled by the SPS C-RNTI.

2) The SPS periodicities are transmitted in the one or more PDCCH orders.

In an implementation, when transmitting the SPS frequency resources, the network side device can put all the SPS frequency resource configuration information in a PDCCH order, or can put a different piece of SPS frequency resource configuration information in a different PDCCH order.

If all the SPS frequency resource configuration information is carried by a PDCCH order, then the network side device may place all the SPS frequency resource configuration information and all the SPS periodicities in the PDCCH order scrambled by the SIPS C-RNTI, and put the correspondence relationships between the SPS periodicities and all the SPS frequency resource configuration information in the PDCCH order.

Correspondingly, after the terminal receives the PDCCH order, the terminal can know which of all the SPS frequency resource configuration information corresponds to which one of the SPS periodicities in the PDCCH order, according to the correspondence relationships between the SPS periodicities and all the SPS frequency resource configuration information in the PDCCH order scrambled by the SPS C-RNTI.

If a different piece of SPS frequency resource configuration information is carried by a different PDCCH order, then the network side device may place both the different SPS frequency resource configuration information and an SPS periodicity corresponding to the different piece of SPS frequency resource configuration information into the different PDCCH order scrambled by the SPS C-RNTI.

Correspondingly, the terminal can know that the different piece of SPS frequency resource configuration information in the different PDCCH order corresponds to the SPS periodicity in the different PDCCH order upon reception of the different PDCCH order.

In an implementation, the network side device can further put SPS configuration index information in the one or more PDCCH orders to indicate each SPS configuration index corresponding to each of the plurality of SPS configurations.

For example, the SPS configuration index can be N bits. The value of N is determined by the number of SPS configurations of the service. For example, if the service needs two SPS configurations, then the value of N may be in two bits, where 00 identifies a first SPS configuration, 01 identifies a reconfiguration of the first SPS configuration, 10 identifies the second SPS configuration, and 11 identifies a reconfiguration of the second SPS configuration.

In an implementation, for one of the plurality of SPS configurations, the network side device adds a temporal offset of an SPS frequency resource corresponding to the SPS configuration into a PDCCH order carrying a piece of SPS frequency resource configuration information corresponding to the SPS configuration.

The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

The network side device configures the terminal with the plurality of SPS configurations as introduced above. After the configuration, the service can be transmitted according to the SPS configurations.

If the SPS configurations are uplink SPS configurations, then the network side device is a transmitter, and the terminal is a receiver.

If the SPS configurations are downlink SPS configurations, then the network side device is a receiver, and the terminal is a transmitter.

The transmitter selects the SPS configuration to be used by the terminal from the plurality of SPS configurations.

Correspondingly, if the receiver can predict the SPS configuration to be used by the terminal, selected h the transmitter from the plurality of SPS configurations (e.g., according to information such as a service model), then the receiver may receive SPS data according to the predicted SPS configuration to be used by the terminal. Otherwise, the receiver detects the plurality of SPS configurations blindly.

Apart from the predication by the receiver, if the transmitter and the receiver agree on a particular selection criterion, then the receiver may select the SPS configuration to be used by the terminal from the plurality of SPS configurations according to the particular selection criterion, and detect directly the SPS configuration to be used by the terminal.

In an implementation, when the transmitter selects the SPS configuration to be used by the terminal from the plurality of SPS configurations: if the plurality of SPS configurations do not overlap in the time domain, then the transmitter determines the plurality of SPS configurations as SPS configurations to be used by the terminal; or, if the plurality of SPS configurations overlap in the time domain, then the transmitter selects the SPS configuration to be used by the terminal from the plurality of SPS configurations according to the preset selection criterion.

In an implementation, the selection criterion is one of following criterions: selecting a largest SPS frequency resource block; selecting a smallest SPS frequency resource block; and, selecting an SPS frequency resource block according to data to be transmitted.

Figure 2:
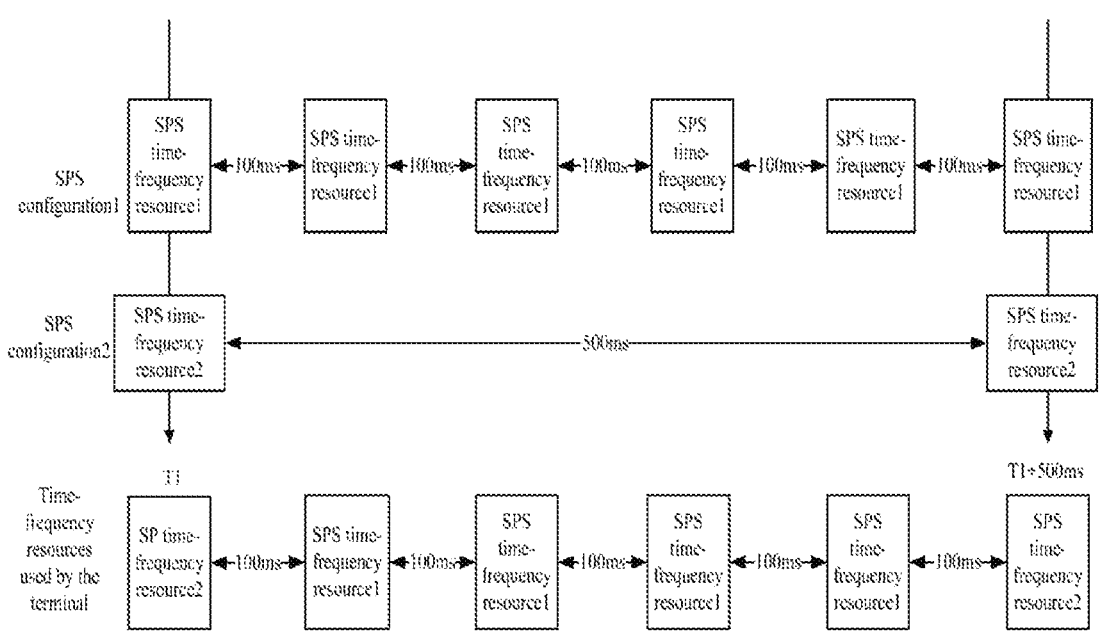
FIG. 2 is a schematic diagram of overlapping SPS frequency resources according to an embodiment of the disclosure.

Taking the V2V communication as an example, if the transmitter has two SPS configurations for the same service and frequency domain resources of the two SPS configurations overlap in the time domain, then the transmitter selects an SPS configuration having a larger SPS frequency resource, as illustrated in FIG. 2.

SPS frequency resources at both the T1 position and the T1+500 ms position overlap, and the SPS configuration 2 is selected according to the selection criterion of selecting the SPS configuration having the larger SPS frequency resource block. For other position, since the SPS resources do not overlap in the time domain, hence any available SPS frequency resource can be selected.

If an SPS frequency resource is determined according to the selection criterion of selecting the smallest SPS frequency resource block, then since the SPS frequency resources at both the T1 position and the T1+500 ms position overlap as illustrated in FIG. 2, the SPS configuration 1 is selected.

If an SPS frequency resource block is selected according to data to be transmitted, then an SPS frequency resource block having a size not smaller than the size of the data to be transmitted is selected. For example, the SPS frequency resources at both the T1 position and the T1+500 ms position overlap as illustrated in FIG. 2, if data to be transmitted can be transmitted by selecting the SPS configuration 1, then the SPS configuration 1 is selected; or, if data to be transmitted cannot be transmitted by selecting the SPS configuration 1, but can be transmitted by selecting the SPS configuration 2, then the SPS configuration 2 is selected.

In an implementation, after the network side device configures the terminal with the plurality of SPS configurations, it can further release the plurality of SPS configurations wider a condition of triggering releasing of the SPS configurations such as that the corresponding service is completed, or that the service is required to be stopped.

In the embodiments of the disclosure, an SPS configuration can be released implicitly and explicitly as introduced below, respectively.

1. The plurality of SPS configurations are released implicitly.

If the plurality of SPS configurations are uplink SPS configurations, for each of the plurality of SPS configurations: the terminal transmits N consecutive padding BSRs having no data parts to the network side device over a resource of the SPS configuration to instruct the network side device to release the SPS configuration.

Correspondingly, for each of the plurality of SPS configurations: if the network side device receives N consecutive padding BSRs having no data parts over a resource corresponding to the SPS configuration, then the network side device releases the SPS configuration.

2. The plurality of SPS configurations are released explicitly.

The network side device releases the plurality of SPS configurations, by using at least one PDCCH order scrambled by the SPS C-RNTI. For example, a special value of some field(s) in the at least one PDCCH order indicates that the at least one PDCCH order is used for indicating releasing.

Correspondingly, the terminal releases the plurality of SPS configurations upon reception of the at least one PDCCH order scrambled by the SPS C-RNTI.

The network side device according to the embodiments of the disclosure can be a base station (e.g., a macro base station (including an evolved base station), a home base station, and etc.), or can be a Relay Node (RN) device, or can be another kind of network side device.

Figure 3:
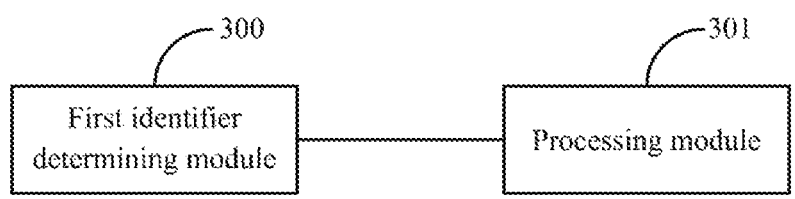
FIG. 3 is a schematic structural diagram of a first network side device according to an embodiment of the disclosure.

As illustrated by FIG. 3, a first network side device according to an embodiment of the disclosure includes: a first identifier determining module 300 configured to determine an SPS C-RNTI corresponding to a plurality of SPS configurations, and a processing module 301 configured to transmit SPS periodicities corresponding to the plurality of SPS configurations and/or SPS frequency resource configuration information corresponding to the plurality of SPS configurations, to a terminal via one or more PDCCH orders scrambled by the SPS C-RNTI.

In an implementation, when the processing module 301 transmits the SPS frequency resource configuration information corresponding to the plurality of SPS configurations to the terminal via the one or more PDCCH orders scrambled by the SPS C-RNTI, the processing module 301 is further configured to transmit the SPS periodicities corresponding to the plurality of SPS configurations to the terminal via one or more RRC signalings, before transmitting the SPS frequency resource configuration information corresponding to the plurality of SPS configurations to the terminal via the one or more PDCCH orders scrambled by the SPS C-RNTI.

In an implementation, the processing module 301 is further configured to: when SPS periodicities corresponding to at least two of the plurality of SPS configurations are the same, put the same SPS periodicity in one of the one or more RRC signalings.

In an implementation, SPS periodicities corresponding to all or a part of the SPS configurations are the same. And the processing module 301 is further configured to put the same SPS periodicity in one of the one or more PDCCH orders, before transmitting the SPS periodicities corresponding to the plurality of SPS configurations to the terminal via the one or more PDCCH orders scrambled by the SPS C-RNTI.

In an implementation, some of the SPS periodicities corresponding to the plurality of SPS configurations are different. And the processing module 301 is further configured to put correspondence relationships between SPS periodicities and the SPS frequency resource configuration information in the one or more PDCCH orders before transmitting the SPS frequency resource configuration information corresponding to the plurality of SPS configurations to the terminal.

In an implementation, SPS frequency resource configuration information corresponding to a part of or all of the SPS configurations is the same. And the processing module 301 is further configured to put the same SPS frequency resource configuration information in one of the one or more PDCCH orders before transmitting the SPS frequency resource configuration information corresponding to the plurality of SPS configurations to the terminal via the one or more PDCCH orders scrambled by the SPS C-RNTI.

In an implementation, the processing module 301 is further configured to put SPS configuration index information in the one or more PDCCH orders before transmitting the SPS frequency resource configuration information corresponding to the plurality of SPS configurations to the terminal, where each SPS configuration index corresponds to one SPS configuration.

In an implementation, the processing module 301 is further configured to: for each of the plurality of SPS configurations: add a temporal offset of an SPS frequency resource corresponding to the SPS configuration into a PDCCH order carrying SPS frequency resource configuration information corresponding to the SPS configuration, where the temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, the processing module 301 is further configured to: release the plurality of SPS configurations configured for the terminal, via at least one PDCCH order scrambled by the SPS C-RNTI after transmitting the SPS frequency resource configuration information corresponding to the plurality of SPS configurations to the terminal.

In an implementation, the plurality of SPS configurations are uplink SPS configurations. And the processing module 301 is further configured to: for each of the plurality of SPS configurations: release the SPS configuration upon reception of N consecutive padding BSRs having no data parts over a resource corresponding to the SPS configuration, after transmitting the SPS frequency resource configuration information corresponding to the plurality of SPS configurations to the terminal.

In an implementation, the processing module 301 is further configured to: determine the plurality of SPS configurations as SPS configurations to be used by the terminal when the plurality of SPS configurations do not overlap in a time domain; or, determine an SPS configuration to be used by the terminal, from the plurality of SPS configurations according to a preset selection criterion, when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

Figure 4:
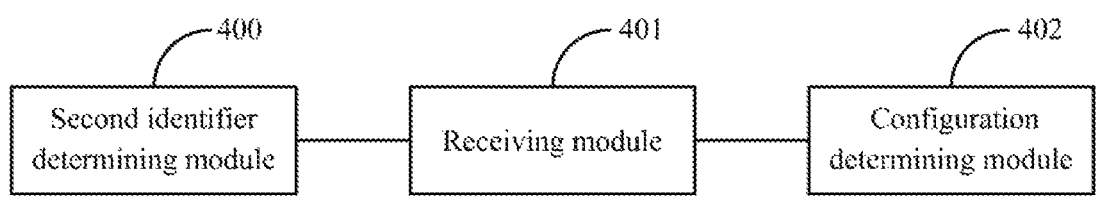
FIG. 4 is a schematic structural diagram of a first terminal according to an embodiment of the disclosure.

As illustrated in FIG. 4, a first terminal according to an embodiment of the disclosure includes: a second identifier determining module 400 configured to determine an SPS C-RNTI corresponding to a plurality of SPS configurations; a receiving module 401 configured to receive one or more PDCCH orders scrambled by the SPS C-RNTI, from a network side device; and a configuration determining module 402 configured to: determine SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determine the plurality of SPS configurations according to the determined information corresponding to the plurality of SPS configurations.

In an implementation, the configuration determining module 402 is further configured to determine the SPS periodicities corresponding to the plurality of SPS configurations configured by the network side device for the terminal, via one or more RRC signalings before determining the plurality of SPS configurations according to the determined information corresponding to the plurality of SPS configurations configured by the network side device for the terminal, according to the one or more PDCCH orders scrambled by the SPS C-RNTI.

In an implementation, the configuration determining module 402 is further configured to: determine the plurality of SPS configurations as SPS configurations to be used by the terminal when the plurality of SPS configurations do not overlap in a time domain; or, determine, an SPS configuration to be used by the terminal, from the plurality of SPS configurations according to a preset selection criterion when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In an implementation, the plurality of SPS configurations are uplink SPS configurations. And the configuration determining module 402 is further configured to: for each of the plurality of SPS configurations: transmit N consecutive padding BSRs having no data parts to the network side device over a resource of the SPS configuration to instruct the network side device to release the SPS configuration.

Figure 5:
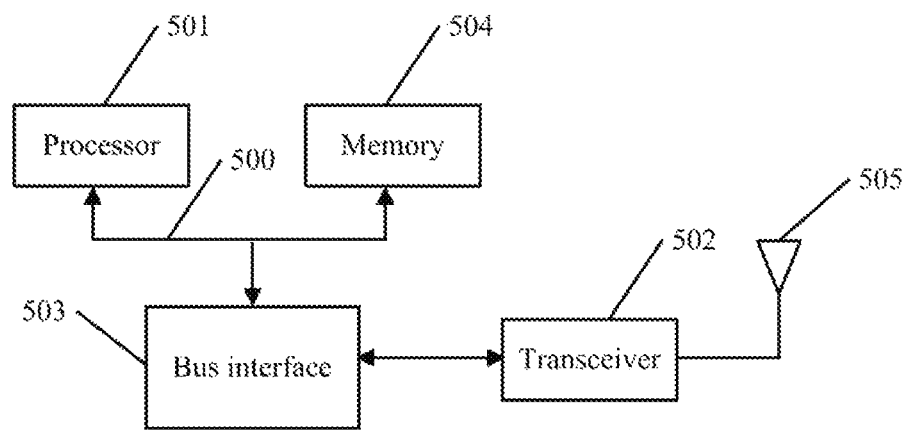
FIG. 5 is a schematic structural diagram of a second network side device according to an embodiment of the disclosure.

As illustrated in FIG. 5, a second network side device according to an embodiment of the disclosure includes a processor 501 configured to read instructions in a memory 504 to: determine an SPS C-RNTI corresponding to a plurality of SPS configurations, and control a transceiver 502 to transmit SPS periodicities corresponding to the plurality of SPS configurations and/or SPS frequency resource configuration information corresponding to the plurality of SPS configurations, to a terminal via one or more PDCCH orders scrambled by the SPS C-RNTI. The transceiver 502 is configured to receive and transmit data under the control of the processor 501.

In an implementation, when the processor 501 controls the transceiver 502 to transmit the SPS frequency resource configuration information corresponding to the plurality of SPS configurations to the terminal via the one or more PDCCH orders scrambled by the SPS C-RNTI, the processor 501 is further configured to control the transceiver 502 to transmit the SPS periodicities corresponding to the plurality of SPS configurations to the terminal via one or more RRC signalings, before controlling the transceiver 502 to transmit the SPS frequency resource configuration information corresponding to the plurality of SPS configurations to the terminal via the one or more PDCCH orders scrambled by the SPS C-RNTI.

In an implementation, when SPS periodicities corresponding to at least two of the plurality of SPS configurations are the same, the processor 501 is further configured to put the same SPS periodicity in one of the one or more RRC signalings.

In an implementation, SPS periodicities corresponding to all or a part of the SPS configurations are the same. And the processor 501 is further configured to put the same SPS periodicity in one of the one or more PDCCH orders, before transmitting the SPS periodicities corresponding to the plurality of SPS configurations to the terminal via the one or more PDCCH orders scrambled by the SPS C-RNTI.

In an implementation, some of the SPS periodicities corresponding to the plurality of SPS configurations are different. The processor 501 is further configured to put correspondence relationships between SPS periodicities and the SPS frequency resource configuration information in the one or more PDCCH orders before controlling the transceiver 502 to transmit the SPS frequency resource configuration information corresponding to the plurality of SPS configurations to the terminal.

In an implementation, SPS frequency resource configuration information corresponding to a part of or all of the SPS configurations is the same. And the processor 501 is further configured to put the same SPS frequency resource configuration information in one of the one or more PDCCH orders before controlling the transceiver 502 to transmit the SPS frequency resource configuration information corresponding to the plurality of SPS configurations to the terminal via the one or more PDCCH orders scrambled by the SPS C-RNTI.

In an implementation, the processor 501 is further configured to put SPS configuration index information in the one or more PDCCH orders before controlling the transceiver 502 to transmit the SPS frequency resource configuration information corresponding to the plurality of SPS configurations to the terminal, where each SPS configuration index corresponds to one SPS configuration.

In an implementation, the processor 501 is further configured to: for each of the plurality of SPS configurations: add a temporal offset of an SPS frequency resource corresponding to the SPS configuration into a PDCCH order carrying SPS frequency resource configuration information corresponding to the SPS configuration. The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, the processor 501 is further configured to release the plurality of SPS configurations configured for the terminal, via at least one PDCCH order scrambled by the SPS C-RNTI after controlling the transceiver 502 to transmit the SPS frequency resource configuration information corresponding to the plurality of SPS configurations to the terminal.

In an implementation, the plurality of SPS configurations are uplink SPS configurations, And the processor 501 is further configured to: for each of the plurality of SPS configurations: release the SPS configuration upon reception of N consecutive padding BSRs having no data parts over a resource corresponding to the SPS configuration, after controlling the transceiver 502 to transmit the SPS frequency resource configuration information corresponding to the plurality of SPS configurations to the terminal.

In an implementation, the processor 501 is further configured to: determine the plurality of SPS configurations as SPS configurations to be used by the terminal when the plurality of SPS configurations do not overlap in a time domain; or, determine an SPS configuration to be used by the terminal, from the plurality of SPS configurations according to a preset selection criterion, when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In FIG. 5, the bus architecture (represented by a bus 500), the bus 500 can include any number of interconnecting buses and bridges to particularly link together various circuits including one or more processors represented by the processor 501, and one or more memories represented by the memory 504. The bus 500 can further link together various other circuits, e.g., a peripheral device, a manostat, a power management circuit, etc., all of which are well known in the art, so a further description thereof will be omitted in this context. A bus interface 503 serves as an interface between the bus 500 and the transceiver 502. The transceiver 502 can be an element, or a number of elements, e.g., a number of transmitters and receivers, which are units for communication with various other devices over a transmission medium. Data processed by the processor 501 are transmitted over a wireless medium through an antenna 505, and furthermore the antenna 505 further receives data and transmits the data to the processor 501.

The processor 501 is responsible for managing the bus 500 and performing normal processes, and can further provide various functions including timing, a peripheral interface, voltage regulation, power source management, and other control functions. The memory 504 can store data for use by the processor 501 in performing the operations.

In an implementation, the processor 501 can be a Central Processing Unit (CPU), an Application Specific Integrated Circuit (ASIC), a Field-Programmable Gate Array (FPGA), or a Complex Programmable Logic Device (CPLD).

Figure 6:
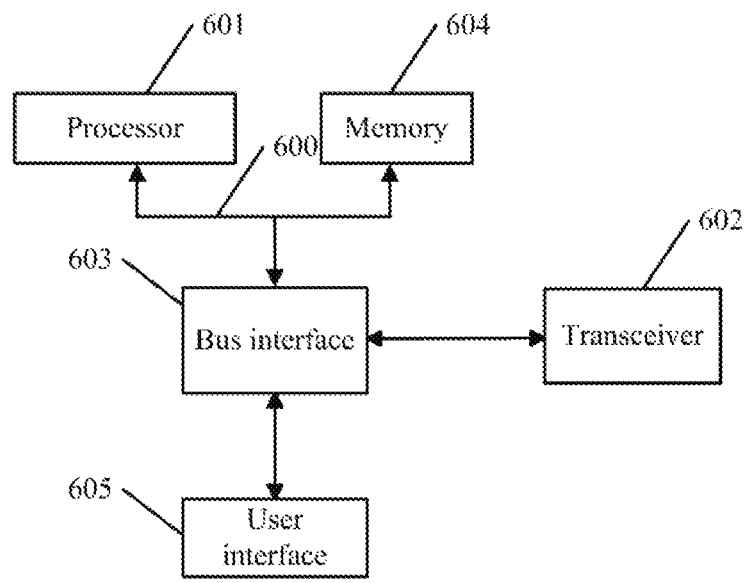
FIG. 6 is a schematic structural diagram of a second terminal according to an embodiment of the disclosure.

As illustrated in FIG. 6, a second terminal according to an embodiment of the disclosure includes a processor 601 configured to read instructions in a memory 604 to: determine an SPS C-RNTI corresponding to a plurality of SPS configurations, control a transceiver 602 to receive one or more PDCCH orders scrambled by the SPS C-RNTI, from a network side device, determine SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determine the plurality of SPS configurations according to the determined information corresponding to the plurality of SPS configurations.

The transceiver 602 is configured to receive and transmit data under the control of the processor 601.

In an implementation, the processor 601 is further configured to determine the SPS periodicities corresponding to the plurality of SPS configurations configured by the network side device for the terminal, via one or more RRC signalings before determining the plurality of SPS configurations according to the determined information, when determining the SPS frequency resource configuration information corresponding to the plurality of SPS configurations configured by the network side device for the terminal, according to the one or more PDCCH orders scrambled by the SPS C-RNTI.

In an implementation, the processor 601 is further configured to: determine the plurality of SPS configurations as SPS configurations to be used by the terminal when the plurality of SPS configurations do not overlap in a time domain; or, determine, an SPS configuration to be used by the terminal, from the plurality of SPS configurations according to a preset selection criterion when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In an implementation, the plurality of SPS configurations are uplink SPS configurations. And the processor 601 is further configured to: for each of the plurality of SPS configurations: transmit N consecutive padding BSRs having no data parts to the network side device over a resource of the SPS configuration to instruct the network side device to release the SPS configuration.

In FIG. 6, the bus architecture (represented by a bus 600), the bus 600 can include any number of interconnecting buses and bridges to particularly link together various circuits including one or more processors represented by the processor 601, and one or more memories represented by the memory 604. The bus 600 can further link together various other circuits, e.g., a peripheral device, a manostat, a power management circuit, etc., all of which are well known in the art, so a further description thereof will be omitted in this context. A bus interface 603 serves as an interface between the bus 600 and the transceiver 602. The transceiver 602 can be an element, or a number of elements, e.g., a number of transmitters and receivers, which are units for communication with various other devices over a transmission medium. For example, the transceiver 602 receives external data from another device. The transceiver 602 is configured to transmit data processed by the processor 601 to the other device. A user interface 605, e.g., a keypad, a display, a loudspeaker, a microphone, a joystick, etc., can be further provided dependent upon the nature of a computing system.

The processor 601 is responsible for managing the bus 600 and performing normal processes, and can further provide various functions including timing, a peripheral interface, voltage regulation, power source management, and other control functions. The memory 604 can store data for use by the processor 601 in performing the operations.

In an implementation, the processor 601 can be a CPU, an ASIC, an FPGA, or a CPLD.

Based upon the same inventive idea, an embodiment of the disclosure further provides a method for configuring the semi-persistent scheduling. Since a device corresponding to this method is the network side device in the system for configuring semi-persistent scheduling according to the embodiments of the disclosure, and this method addresses the problems under a similar principle to the system, reference can be made to the implementation of the system for an implementation of this method, and a repeated description thereof is omitted here.

Figure 7:
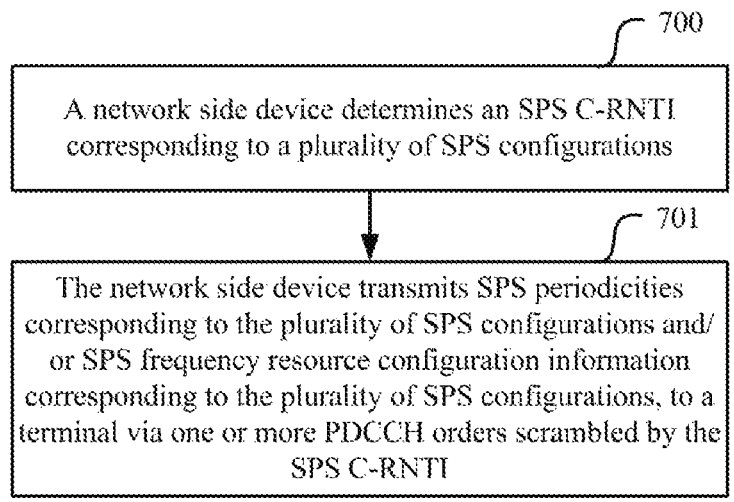
FIG. 7 is a schematic flow chart of a first method for configuring semi-persistent scheduling according to an embodiment of the disclosure.

As illustrated in FIG. 7, a first method for configuring semi-persistent scheduling according to an embodiment of the disclosure includes the operations 700-701.

At the operation 700, a network side device determines an SPS C-RNTI corresponding to a plurality of SPS configurations.

At the operation 701, the network side device transmits SPS periodicities corresponding to the plurality of SPS configurations and/or SPS frequency resource configuration information corresponding to the plurality of SPS configurations, to a terminal via one or more PDCCH orders scrambled by the SPS C-RNTI.

In an implementation, the network side device transmits the SPS frequency resource configuration information corresponding to the plurality of SPS configurations to the terminal via the one or more PDCCH orders scrambled by the SPS C-RNTI. And before the network side device transmits the SPS frequency resource configuration information corresponding to the plurality of SPS configurations to the terminal via the one or more PDCCH orders scrambled by the SPS C-RNTI, the method further includes: transmitting, by the network side device, the SPS periodicities corresponding to the plurality of SPS configurations to the terminal via one or more RRC signalings.

In an implementation, transmitting, by the network side device, the SPS periodicities corresponding to the plurality of SPS configurations to the terminal via the one or more RRC signalings includes: when SPS periodicities corresponding to at least two of the plurality of SPS configurations are the same, putting, by the network side device, the same SPS periodicity in one of the one or more RRC signalings.

In an implementation, SPS periodicities corresponding to all or a part of the SPS configurations are the same. And before the network side device transmits the SPS periodicities corresponding to the plurality of SPS configurations to the terminal via the one or more PDCCH orders scrambled by the SPS C-RNTI, the method further includes: putting, by the network side device, the same SPS periodicity in one of the one or more PDCCH orders.

In an implementation, some of the SPS periodicities corresponding to the plurality of SPS configurations are different. And before the network side device transmits the SPS frequency resource configuration information corresponding to the plurality of SPS configurations to the terminal, the method further includes: putting, by the network side device, correspondence relationships between SPS periodicities and the SPS frequency resource configuration information in the one or more PDCCH orders.

In an implementation, SPS frequency resource configuration information corresponding to a part of or all of the SPS configurations is the same. And before the network side device transmits the SPS frequency resource configuration information corresponding to the plurality of SPS configurations to the terminal via the one or more PDCCH orders scrambled by the SPS C-RNTI, the method further includes: pulling, by the network side device, the same SPS frequency resource configuration information in one of the one or more PDCCH orders.

In an implementation, before the network side device transmits the SPS frequency resource configuration information corresponding to the plurality of SPS configurations to the terminal, the method further includes: putting, by the network side device, SPS configuration index information in the one or more PDCCH orders, where each SPS configuration index corresponds to one SPS configuration.

In an implementation, transmitting, by the network side device, the SPS frequency resource configuration information corresponding to the plurality of SPS configurations to the terminal further includes: for each of the plurality of SPS configurations: adding, by the network side device, a temporal offset of an SPS frequency resource corresponding to the SPS configuration into a PDCCH order carrying SPS frequency resource configuration information corresponding to the SPS configuration, where the temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, transmitting, by the network side device, the SPS frequency resource configuration information corresponding to the plurality of SPS configurations to the terminal further includes: for each of the plurality of SPS configurations: adding, by the network side device, a temporal offset of an SPS frequency resource corresponding to the SPS configuration into a PDCCH order carrying SPS frequency resource configuration information corresponding to the SPS configuration, where the temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In an implementation, the plurality of SPS configurations are uplink SPS configurations, And after the network side device transmits the SPS frequency resource configuration information corresponding to the plurality of SPS configurations to the terminal, the method further includes: for each of the plurality of SPS configurations: releasing, by the network side device, the SPS configuration upon reception of N consecutive padding BSRs having no data parts over a resource corresponding to the SPS configuration.

In an implementation, after the network side device transmits the SPS frequency resource configuration information corresponding to the plurality of SPS configurations to the terminal, the method further includes: determining, by the network side device, the plurality of SPS configurations as SPS configurations to be used by the terminal when the plurality of SPS configurations do not overlap in a time domain; or, determining, by the network side device, an SPS configuration to be used by the terminal, from the plurality of SPS configurations according to a preset selection criterion, when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

Based upon the same inventive idea, an embodiment of the disclosure further provides a method for determining SPS configurations. Since a device corresponding to this method is the terminal in the system for configuring semi-persistent scheduling according to the embodiments of the disclosure, and this method addresses the problems under a similar principle to the system, reference can be made to the implementation of the system for an implementation of this method, and a repeated description thereof is omitted here.

Figure 8:
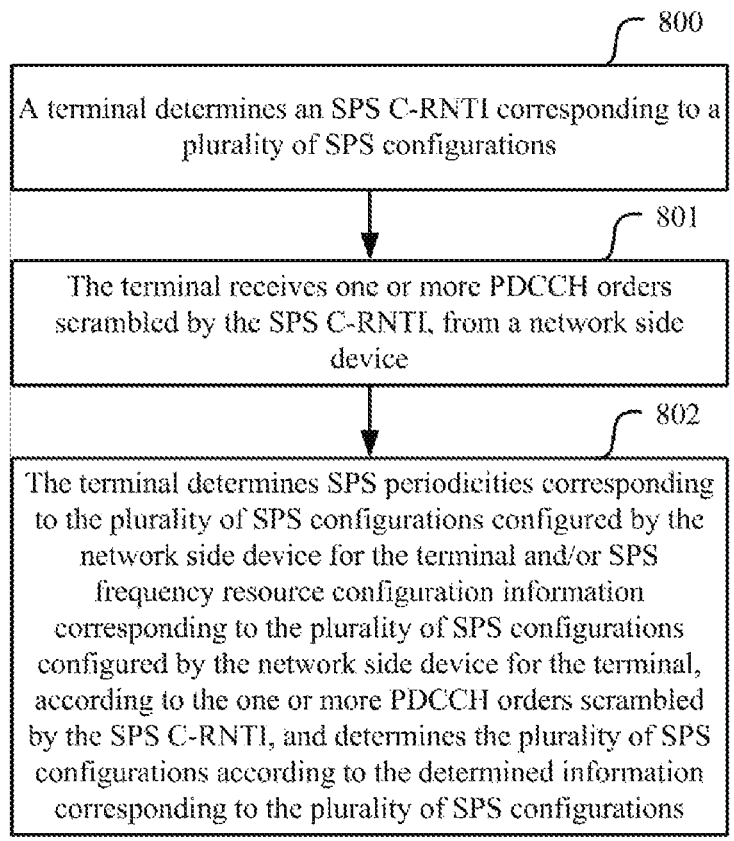
FIG. 8 is a schematic flow chart of a second method for determining semi-persistent scheduling according to an embodiment of the disclosure.

As illustrated in FIG. 8, a second method for determining semi-persistent scheduling according to an embodiment of the disclosure includes the operations 800-802.

At the operation 800, a terminal determines an SPS C-RNTI corresponding to a plurality of SPS configurations.

At the operation 801, the terminal receives one or more PDCCH orders scrambled by the SPS C-RNTI, from a network side device.

At the operation 802, the terminal determines SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determines the plurality of SPS configurations according to the determined information corresponding to the plurality of SPS configurations.

In an implementation, the terminal determines the SPS frequency resource configuration information corresponding to the plurality of SPS configurations configured by the network side device for the terminal, according to the one or more PDCCH orders scrambled by the SPS C-RNTI. And before the terminal determines the plurality of SPS configurations according to the determined information, the method further includes: determining, by the terminal, the SPS periodicities corresponding to the plurality of SPS configurations configured by the network side device for the terminal, via one or more RRC signalings.

In an implementation, after the terminal determines the plurality of SPS configurations, the method further includes: determining, by the terminal, the plurality of SPS configurations as SPS configurations to be used by the terminal when the plurality of SPS configurations do not overlap in a time domain; or, determining, by the terminal, an SPS configuration to be used by the terminal, from the plurality of SPS configurations according to a preset selection criterion when the plurality of SPS configurations overlap in the time domain.

In an implementation, the selection criterion is one of following criterions: selecting a largest SPS frequency resource block; selecting a smallest SPS frequency resource block; and, selecting an SPS frequency resource block according to data to be transmitted.

In an implementation, the plurality of SPS configurations are uplink SPS configurations. And after the terminal determines the plurality of SPS configurations, the method further includes: for each of the plurality of SPS configurations: transmitting, by the terminal, N consecutive padding BSRs having no data parts to the network side device over a resource of the SPS configuration to instruct the network side device to release the SPS configuration.

The solutions according to the disclosure will be described below in details by way of several examples.

In a first embodiment, the SPS periodicities corresponding to the plurality of SPS configurations are the same, whereas the SPS frequency resources corresponding to the plurality of SPS configurations are different.

At the first operation, the base station determines an SPS C-RNTI and the SPS periodicity for the service, and notifies the terminal of both the SPS C-RNTI and the SPS periodicity.

Since the SPS periodicities corresponding to the plurality of SPS configurations are the same, the base station may put the SPS periodicity into one RRC signaling scrambled by the SPS C-RNTI.

At the second operation, the base station transmits one or more PDCCH orders to activate the SPS.

The one or more PDCCH orders can be implemented in the following two ways.

In a first implementation, the base station puts the SPS frequency resource configuration information corresponding to the plurality of SPS configurations in one PDCCH order.

For example, the SPS frequency resource configuration information corresponding to the plurality of SPS configurations consists of SPS frequency resource configuration information A and SPS frequency resource configuration information B, and both the SPS frequency resource configuration information A and the SPS frequency resource configuration information B may be put in the same PDCCH order.

Moreover, in the first implementation, for each of the plurality of SPS configurations, a temporal offset of an SPS frequency resource corresponding to the SPS configuration can be into the PDCCH order, so that the SPS configurations do not overlap in the time domain. The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In a second implementation, the base station puts a piece of SPS frequency resource configuration information corresponding to a different SPS configuration in a different PDCCH order.

For example, the SPS frequency resource configuration information corresponding to the plurality of SPS configurations consists of SPS frequency resource configuration information A and SPS frequency resource configuration information B, and the SPS frequency resource configuration information A may be put in a PDCCH order, and the SPS frequency resource configuration information B may be put in another PDCCH order.

In the second implementation, the content of each of the PDCCH orders needs to indicate whether the PDCCH order relates to a reconfiguration of a certain SPS frequency resource corresponding to the service, or relates to configuration information of another SPS configuration for the service.

Moreover, the base station can put SPS configuration index information in the one or more PDCCH orders, where each SPS configuration index corresponds to one SPS configuration.

For example, the SPS configuration index can have N bits. The value of N depends on the number of SPS configurations of the service. For example, if the service needs two SPS configurations, then the value of N may be in two bits, where 00 identifies a first SPS configuration, 01 identifies a reconfiguration of the first SPS configuration, 10 identifies the second SPS configuration, and 11 identifies a reconfiguration of the second SPS configuration.

At the third operation, the terminal determines the plurality of SPS configurations allocated by the base station.

The terminal determines that the one or more PDCCH orders scrambled by the same SPS C-RNTI relates to the same service, according to the RRC signaling and according to the one or more PDCCH orders for SPS activation.

The terminal determines the plurality of SPS configurations for the same service according to the SPS frequency resource configuration information in the one or more PDCCH orders, and according to the SPS periodicities corresponding to the SPS configurations configured by the RRC signaling.

For example, the SPS frequency resource configuration information corresponding to the plurality of SPS configurations consists of SPS frequency resource configuration information A and SPS frequency resource configuration information B, and an SPS C-RNTI in RRC signaling including an SPS periodicity 1 is XX. If a PDCCH order scrambled by XX includes the SPS frequency resource configuration information A and the SPS frequency resource configuration information B, then the terminal determines that both the SPS frequency resource configuration information A and the SPS frequency resource configuration information B relate to SPS configurations for the same service, and SPS periodicities of the SPS frequency resource configuration information A and the B equal to the SPS periodicity 1.

The terminal determines an SPS configuration according to both the SPS periodicity 1 and the SPS frequency resource configuration information A, and determines another SPS configuration according to both the SPS periodicity 1 and the SPS frequency resource configuration information B.

At the fourth operation, a transmitter determines an SPS configuration to be used by the terminal, from the plurality of SPS configurations.

If the service is an uplink service, then the transmitter is the terminal, and a receiver is the base station. If the service is a downlink service, then the transmitter is the base station, and the receiver is the terminal.

If the plurality of SPS configurations do not overlap in the time domain, then the transmitter determines all the configured SPS frequency resources as SPS frequency resources available to the transmitter.

If multiple SPS configurations overlap in the time domain, then the transmitter selects art SPS frequency resource to be used from the SPS frequency resources overlapping in the time domain according one of the following rules, where the rule can be preconfigured, or notified by the base station: always selecting the largest SPS frequency resource block; selecting a corresponding SPS frequency resource block according to the size of the data needs to be transmitted; and, always selecting the smallest SPS frequency resource block.

Taking the V2V communication as an example, if the transmitter has two SPS configurations for the same service and frequency domain resources of the two SPS configurations overlap in the time domain, then the transmitter selects an SPS configuration having a larger SPS frequency resource, as illustrated in FIG. 2.

SPS frequency resources at both the T1 position and the T1+500 ms position overlap, and the SPS configuration 2 is selected according to the selection criterion of selecting the SPS configuration having the larger SPS frequency resource block. For other position, since the SPS resources do not overlap in the time domain, hence any available SPS frequency resource can be selected.

At the fifth operation, the receiver detects the SPS.

If multiple SPS configurations overlap in the time domain, and the receiver (i.e., the base station in the uplink, or the terminal in the downlink) selects an SPS frequency resource to be used from SPS frequency resources overlapping in the time domain under the rule that a corresponding SPS frequency resource block should be selected according to an actual size of data to be transmitted.

If the receiver can predict an SPS frequency resource block size to be used by the transmitter (e.g., according to information such as the service model), then the receiver may receive SPS data according to the predicted SPS frequency resource block size to be used by the terminal. Otherwise, the receiver detects the plurality of SPS configurations blindly.

If the receiver can be determined the SPS frequency resource the transmitter selects from SPS frequency resources overlapping in the time domain, then the receiver can determine the SPS frequency resource to be used by the transmitter, and detect the SPS frequency resource directly.

At the sixth operation, SPS frequency resources for the same service are released.

For the same service, if different SPS frequency resources are released implicitly, then the different SPS frequency resources may be released separately. Otherwise if the different SPS frequency resources are released explicitly, then the different SPS frequency resources may be released concurrently.

In other words, for uplink SPS, the SPS frequency resources can be released implicitly as follows: for each of the plurality of SPS configurations, the terminal transmits N consecutive padding BSRs having no data parts over a frequency resource corresponding to the SPS configuration to instruct the network side device to release the SPS configuration implicitly; or, the SPS frequency resources can be released explicitly as follows: the base station can release all the uplink SPS frequency resources configured for the service, via one or more PDCCH orders scrambled by the SPS C-RNTI. Whereas for a downlink service, the SPS frequency resources can only be released explicitly, that is, the base station can release all the downlink SPS frequency resources configured for the service, via one or more PDCCH orders scrambled by the SPS C-RNTI.

In a second embodiment, the SPS periodicities corresponding to the plurality of SPS configurations are different, whereas the SPS frequency resources are the same.

At the first operation, the base station determines an SPS C-RNTI and SPS periodicities corresponding to a plurality of SPS configurations, for the service.

Since the SPS periodicities corresponding to the plurality of SPS configurations of the same service are different, the base station cannot put the SPS periodicities into one RRC signaling, but can only put the SPS periodicities into one PDCCH order for activating the SPS.

At the second operation, the base station transmits the PDCCH order for activating the SPS.

Since SPS frequency resources corresponding to the plurality of SPS configurations are the same, only one piece of SPS configuration information needs to be carried in the PDCCH order together with the SPS periodicities of the plurality of SPS configurations. In order to prevent the SPS configurations from overlapping in the time domain, for each SPS configuration, a temporal offset of an SPS frequency resource corresponding to the SPS configuration can be into the PDCCH order. The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

At the third operation, the terminal determines the plurality of SPS configurations allocated by the base station.

The terminal determines that the PDCCH order scrambled by the same SPS C-RNTI relates to the same service, according to the RRC signaling and according to the PDCCH order for SPS activation.

The terminal determines the plurality of SPS configurations for the same service according to the SPS frequency resource configuration information in the PDCCH order, and according to the SPS periodicities corresponding to the SPS configurations configured by the RRC signaling.

For example, SPS frequency resource configuration information A, an SPS periodicity 1, and an SPS periodicity 2 are configured, and the SPS C-RNTI is XX. If the PDCCH order scrambled by XX includes the SPS frequency resource configuration information A, the SPS periodicity 1, and the SPS periodicity 2, then the terminal determines that the SPS frequency resource configuration information A, the SPS periodicity 1, and the SPS periodicity 2 relate to SPS configurations for the same service.

The terminal determines an SPS configuration according to both the SPS periodicity 1 and the SPS frequency resource configuration information A, and determines another SPS configuration according to both the SPS periodicity 2 and the SPS frequency resource configuration information A.

The network side device can also determine a plurality of SPS configurations for the terminal when needing to transmit a service with the terminal. The network side device can determine the plurality of SPS configurations configured for the terminal as described in the third operation.

At the fourth operation, a transmitter determines an SPS configuration to be used by the terminal, from the plurality of SPS configurations.

If the service is an uplink service, then the transmitter is the terminal, and a receiver is the base station. If the service is a downlink service, then the transmitter is the base station, and the receiver is the terminal.

If the plurality of SPS configurations do not overlap in the time domain, then the transmitter determines all the configured SPS frequency resources as SPS frequency resources available to the transmitter.

If multiple SPS configurations overlap in the time domain, then the transmitter selects an SPS frequency resource to be used from the SPS frequency resources overlapping in the time domain according one of the following rules, where the rule can be preconfigured, or notified by the base station: always selecting the largest SPS frequency resource block; selecting a corresponding SPS frequency resource block according to the size of the data needs to be transmitted; and, always selecting the smallest SPS frequency resource block.

Taking the V2V communication as an example, if the transmitter has two SPS configurations for the same service and frequency domain resources of the two SPS configurations overlap in the time domain, then the transmitter selects an SPS configuration having a larger SPS frequency resource, as illustrated in FIG. 2.

SPS frequency resources at both the T1 position and the T1+500 ms position overlap, and the SPS configuration 2 is selected according to the selection criterion of selecting the SPS configuration having the larger SPS frequency resource block. For other position, since the SPS resources do not overlap in the time domain, hence any available SPS frequency resource can be selected.

At the fifth operation, the receiver detects the SPS.

If the plurality of SPS configurations overlap in the time domain, and the receiver (i.e., the base station in the uplink, or the terminal in the downlink) selects an SPS frequency resource to be used, from SPS frequency resources overlapping in the time domain under the rule that a corresponding SPS frequency resource block should be selected according to an actual size of data to be transmitted.

If the receiver can predict an SPS frequency resource block size to be used by the transmitter (e.g., according to information such as the service model), then the receiver may receive SPS data according to the predicted SPS frequency resource block size to be used by the terminal. Otherwise, the receiver detects the plurality of SPS configurations blindly.

If the receiver can be determined the SPS frequency resource the transmitter selects from SPS frequency resources overlapping in the time domain, then the receiver can determine the SPS frequency resource to be used by the transmitter, and detect the SPS frequency resource directly.

At the sixth operation, SPS frequency resources for the same service are released.

For the same service, if different SPS frequency resources are released implicitly, then the different SPS frequency resources may be released separately. Otherwise if the different SPS frequency resources are released explicitly, then the different SPS frequency resources may be released concurrently.

In other words, for uplink SPS, the SPS frequency resources can be released implicitly as follows: for each of the plurality of SPS configurations, the terminal transmits N consecutive padding BSRs having no data parts over a frequency resource corresponding to the SPS configuration to instruct the network side device to release the SPS configuration implicitly; or, the SPS frequency resources can be released explicitly as follows: the base station can release all the uplink SPS frequency resources configured for the service, via one or more PDCCH orders scrambled by the SPS C-RNTI. Whereas for a downlink service, the SPS frequency resources can only be released explicitly, that is, the base station can release all the downlink SPS frequency resources configured for the service, via one or more PDCCH orders scrambled by the SPS C-RNTI.

In a third embodiment, the SPS periodicities corresponding to the plurality of SPS configurations are different, and the SPS frequency resources are different.

At the first operation, the base station determines an SPS C-RNTI and SPS periodicities corresponding to a plurality of SPS configurations, for the service.

Since the SPS periodicities corresponding to the plurality of SPS configurations for the same service are different, the SPS periodicities can be carried by one or more RRC signalings, and also correspondence relationships between the SPS periodicities and the SPS frequency resource configuration information can be carried by one or more PDCCH orders. However, it might be more efficient for the one or more PDCCH orders for activating the SPS to carry the SPS periodicities.

At the second operation, the base station transmits the one or more PDCCH orders for activating the SPS.

The one or more PDCCH orders can be implemented in the following two ways.

In a first implementation, the base station puts the SPS frequency resource configuration information corresponding to the plurality of SPS configurations in a PDCCH order.

For example, the SPS frequency resource configuration information corresponding to the plurality of SPS configurations consists of SPS frequency resource configuration information A and SPS frequency resource configuration information B, and both the SPS frequency resource configuration information A and the SPS frequency resource configuration information B may be put in the same PDCCH order.

Moreover, in the first implementation, for each of the plurality of SPS configurations, a temporal offset of an SPS frequency resource corresponding to the SPS configuration can be into the PDCCH order, so that the SPS configurations do not overlap in the time domain. The temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

In a second implementation, the base station puts a piece of SPS frequency resource configuration information corresponding to a different SPS configuration in a different PDCCH order.

For example, the SPS frequency resource configuration information corresponding to the plurality of SPS configurations consists of SPS frequency resource configuration information A and SPS frequency resource configuration information B, and the SPS frequency resource configuration information A may be put in a PDCCH order, and the SPS frequency resource configuration information B may be put in another PDCCH order.

In the second implementation, since both a piece of SPS frequency resource configuration information and an SPS periodicity corresponding to the piece of SPS frequency resource configuration information are carried in a same PDCCH order, it can be determined whether the PDCCH order relates to a reconfiguration of a certain SPS frequency resource corresponding to the service, or relates to configuration information of another SPS configuration for the service.

At the third operation, the terminal determines the plurality of SPS configurations allocated by the base station.

The terminal determines that the one or more PDCCH orders scrambled by the same SPS C-RNTI relates to the same service, according to the one or more RRC signalings and according to the one or more PDCCH orders for SPS activation.

The terminal determines the plurality of SPS configurations for the same service according to the SPS frequency resource configuration information in the one or more PDCCH orders, and according to the SPS periodicities corresponding to the SPS configurations configured by the one or more RRC signalings.

For example, two sets of SPS frequency resources are configured, where one set of SPS frequency resources includes both SPS frequency resource configuration information A and an SPS periodicity 1, and the other set of SPS frequency resources includes both SPS frequency resource configuration information B and an SPS periodicity 2, and an SPS C-RNTI in each of two RRC signalings is XX. If an PDCCH order scrambled by XX includes the SPS frequency resource configuration information A and the SPS periodicity 1, and includes the SPS frequency resource configuration information B and the SPS periodicity 1, then the terminal determines that the SPS frequency resource configuration information A, the SPS periodicity 1, the SPS frequency resource configuration information B and the SPS periodicity 1, relate to SPS configurations for the same service, and that the SPS periodicity of the SPS frequency resource configuration information A is the SPS periodicity 1, and the SPS periodicity of the SPS frequency resource configuration information B is the SPS periodicity 1.

The terminal determines an SPS configuration according to both the SPS periodicity 1 and the SPS frequency resource configuration information A, and determines another SPS configuration according to both the SPS periodicity 1 and the SPS frequency resource configuration information B.

The network side device can also determine a plurality of SPS configurations for the terminal when needing to transmit a service with the terminal. The network side device can determine the plurality of SPS configurations configured for the terminal as described in the third operation. Since the plurality of SPS configurations are configured by the network side device for the terminal, the network side device can also determine directly from the plurality of SPS configurations which SPS configurations correspond to the terminal.

It shall be noted that the network side device can determine the plurality of SPS configurations in a number of implementations. Although some implementations thereof have been described above by way of example, any implementation in which the network side device can determine the plurality of SPS configurations are applicable to the embodiments of the disclosure.

At the fourth operation, a transmitter determines an SPS configuration to be used by the terminal, from the plurality of SPS configurations.

If the service is an uplink service, then the transmitter is the terminal, and a receiver is the base station. If the service is a downlink service, then the transmitter is the base station, and the receiver is the terminal.

If the plurality of SPS configurations do not overlap in the time domain, then the transmitter determines all the configured SPS frequency resources as SPS frequency resources available to the transmitter.

If multiple SPS configurations overlap in the time domain, then the transmitter selects an SPS frequency resource to be used from the SPS frequency resources overlapping in the time domain according one of the following rules, where the rule can be preconfigured, or notified by the base station: always selecting the largest SPS frequency resource block; selecting a corresponding SPS frequency resource block according to the size of the data needs to be transmitted; and, always selecting the smallest SPS frequency resource block.

Taking the V2V communication as an example, if the transmitter has two SPS configurations for the same service and frequency domain resources of the two SPS configurations overlap in the time domain, then the transmitter selects an SPS configuration having a larger SPS frequency resource, as illustrated in FIG. 2.

SPS frequency resources at both the T1 position and the T1+500 ms position overlap, and the SPS configuration 2 is selected according to the selection criterion of selecting the SPS configuration having the larger SPS frequency resource block. For other position, since the SPS resources do not overlap in the time domain, hence any available SPS frequency resource can be selected.

At the fifth operation, the receiver detects the SPS.

If the plurality of SPS configurations overlap in the time domain, and the receiver (i.e., the base station in the uplink or the terminal in the downlink) selects an SPS frequency resource to be used, from SPS frequency resources overlapping in the time domain under the rule that a corresponding SPS frequency resource block should be selected according to an actual size of data to be transmitted.

If the receiver can predict an SPS frequency resource block size to be used by the transmitter (e.g., according to information such as the service model), then the receiver may receive SPS data according to the predicted SPS frequency resource block size to be used by the terminal. Otherwise, the receiver detects the plurality of SPS configurations blindly.

If the receiver can be determined the SPS frequency resource the transmitter selects from SPS frequency resources overlapping in the time domain, then the receiver can determine the SPS frequency resource to be used by the transmitter, and detect the SPS frequency resource directly.

At the sixth operation, SPS frequency resources for the same service are released.

For the same service, if different SPS frequency resources are released implicitly, then the different SPS frequency resources may be released separately. Otherwise if the different SPS frequency resources are released explicitly, then the different SPS frequency resources may be released concurrently.

In other words, for uplink SPS, the SPS frequency resources can be released implicitly as follows: for each of the plurality of SPS configurations, the terminal transmits N consecutive padding BSRs having no data parts over a frequency resource corresponding to the SPS configuration to instruct the network side device to release the SPS configuration implicitly; or, the SPS frequency resources can be released explicitly as follows: the base station can release all the uplink SPS frequency resources configured for the service, via one or more PDCCH orders scrambled by the SPS C-RNTI. Whereas for a downlink service, the SPS frequency resources can only be released explicitly, that is, the base station can release all the downlink SPS frequency resources configured for the service, via one or more PDCCH orders scrambled by the SPS C-RNTI.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the disclosure can be further embodied in hardware and/or software (including firmware, resident software, microcodes, etc.). Still furthermore the disclosure can be embodied in the form of a computer program product on a computer useable or readable storage medium, where the computer program product includes computer useable or readable program codes embodied in the medium to be used by or in connection with an instruction executing system. In the context of the disclosure, the computer useable or readable medium can be any medium which can include, store, communicate, transmit, or transport program to be used by or in connection with an instruction executing system, apparatus or device.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for configuring semi-persistent scheduling, comprising:

determining, by a network side device, a Semi-Persistent Scheduling (SPS) Cell Radio Network Temporary Identifier (C-RNTI) corresponding to a plurality of SPS configurations; and transmitting, by the network side device, SPS periodicities corresponding to the plurality of SPS configurations and/or SPS frequency resource configuration information corresponding to the plurality of SPS configurations, to a terminal via one or more Physical Downlink Control Channel (PDCCH) orders scrambled by the SPS C-RNTI;

wherein after the network side device transmits the SPS frequency resource configuration information corresponding to the plurality of SPS configurations to the terminal, the method further comprises:

releasing, by the network side device, the plurality of SPS configurations configured for the terminal, via at least one PDCCH order scrambled by the SPS C-RNTI;

and/or, wherein the plurality of SPS configurations are uplink SPS configurations, and, after the network side device transmits the SPS frequency resource configuration information corresponding to the plurality of SPS configurations to the terminal, the method further comprises:

for each of the plurality of SPS configurations: releasing, by the network side device, the SPS configuration upon reception of N consecutive padding Buffer Status Reports (BSRs) having no data parts over a resource corresponding to the SPS configuration.

2. The method according to claim 1, wherein the network side device transmits the SPS frequency resource configuration information corresponding to the plurality of SPS configurations to the terminal via the one or more PDCCH orders scrambled by the SPS C-RNTI; and before the network side device transmits the SPS frequency resource configuration information corresponding to the plurality of SPS configurations to the terminal via the one or more PDCCH orders scrambled by the SPS C-RNTI, the method further comprises:

transmitting, by the network side device, the SPS periodicities corresponding to the plurality of SPS configurations to the terminal via one or more Radio Resource Control (RRC) signalings.

3. The method according to claim 2, wherein transmitting, by the network side device, the SPS periodicities corresponding to the plurality of SPS configurations to the terminal via the one or more RRC signalings comprises:

when SPS periodicities corresponding to at least two of the plurality of SPS configurations are the same, putting, by the network side device, the same SPS periodicity in one of the one or more RRC signalings.

4. The method according to claim 1, wherein SPS periodicities corresponding to all or a part of the SPS configurations are the same; and before the network side device transmits the SPS periodicities corresponding to the plurality of SPS configurations to the terminal via the one or more PDCCH orders scrambled by the SPS C-RNTI, the method further comprises:

putting, by the network side device, the same SPS periodicity in one of the one or more PDCCH orders;

and/or, wherein some of the SPS periodicities corresponding to the plurality of SPS configurations are different; and, before the network side device transmits the SPS frequency resource configuration information corresponding to the plurality of SPS configurations to the terminal, the method further comprises:

putting, by the network side device, correspondence relationships between SPS periodicities and the SPS frequency resource configuration information in the one or more PDCCH orders.

5. The method according to claim 1, wherein SPS frequency resource configuration information corresponding to a part of or all of the SPS configurations is the same; and before the network side device transmits the SPS frequency resource configuration information corresponding to the plurality of SPS configurations to the terminal via the one or more PDCCH orders scrambled by the SPS C-RNTI, the method further comprises:

putting, by the network side device, the same SPS frequency resource configuration information in one of the one or more PDCCH orders.

6. The method according to claim 1, before the network side device transmits the SPS frequency resource configuration information corresponding to the plurality of SPS configurations to the terminal, further comprising:

putting, by the network side device, SPS configuration index information in the one or more PDCCH orders, wherein each SPS configuration index corresponds to one SPS configuration.

7. The method according to claim 1, wherein transmitting, by the network side device, the SPS frequency resource configuration information corresponding to the plurality of SPS configurations to the terminal further comprises:

for each of the plurality of SPS configurations:

adding, by the network side device, a temporal offset of an SPS frequency resource corresponding to the SPS configuration into a PDCCH order carrying SPS frequency resource configuration information corresponding to the SPS configuration, wherein the temporal offset of the SPS frequency resource corresponding to the SPS configuration indicates a temporal difference between a time when the SPS configuration is validated and a time when the PDCCH order carrying the temporal offset of the SPS frequency resource corresponding to the SPS configuration is received.

8. The method according to claim 1, after the network side device transmits the SPS frequency resource configuration information corresponding to the plurality of SPS configurations to the terminal, further comprising:

determining, by the network side device, the plurality of SPS configurations as SPS configurations to be used by the terminal when the plurality of SPS configurations do not overlap in a time domain; or determining, by the network side device, an SPS configuration to be used by the terminal, from the plurality of SPS configurations according to a preset selection criterion, when the plurality of SPS configurations overlap in the time domain.

9. The method according to claim 8, wherein the selection criterion is one of following criterions:

selecting a largest SPS frequency resource block;

selecting a smallest SPS frequency resource block; and selecting an SPS frequency resource block according to data to be transmitted.

10. A method for determining semi-persistent scheduling configurations, comprising:

determining, by a terminal, an SPS C-RNTI corresponding to a plurality of SPS configurations;

receiving, by the terminal, one or more PDCCH orders scrambled by the SPS C-RNTI, from a network side device;

determining, by the terminal, SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI; and determining, by the terminal, the plurality of SPS configurations according to the determined information corresponding to the plurality of SPS configurations;

wherein the plurality of SPS configurations are uplink SPS configurations, and after the terminal determines the plurality of SPS configurations, the method further comprises:
for each of the plurality of SPS configurations: transmitting, by the terminal, N consecutive padding BSRs having no data parts to the network side device over a resource of the SPS configuration to instruct the network side device to release the SPS configuration.

11. The method according to claim 10, wherein the terminal determines the SPS frequency resource configuration information corresponding to the plurality of SPS configurations configured by the network side device for the terminal, according to the one or more PDCCH orders scrambled by the SPS C-RNTI; and
before the terminal determines the plurality of SPS configurations according to the determined information, the method further comprises:
determining, by the terminal, the SPS periodicities corresponding to the plurality of SPS configurations configured by the network side device for the terminal, via one or more RRC signalings.

12. The method according to claim 10, after the terminal determines the plurality of SPS configurations, further comprising:
determining, by the terminal, the plurality of SPS configurations as SPS configurations to be used by the terminal when the plurality of SPS configurations do not overlap in a time domain; or
determining, by the terminal, an SPS configuration to be used by the terminal, from the plurality of SPS configurations according to a preset selection criterion when the plurality of SPS configurations overlap in the time domain.

13. The method according to claim 12, wherein the selection criterion is one of following criterions:
selecting a largest SPS frequency resource block;
selecting a smallest SPS frequency resource block; and
selecting an SPS frequency resource block according to data to be transmitted.

14. A terminal for determining semi-persistent scheduling, comprising a processor, a memory, and a transceiver, wherein:
the processor is configured to read instructions in the memory to:
determine an SPS C-RNTI corresponding to a plurality of SPS configurations, control the transceiver to receive one or more PDCCH orders scrambled by the SPS C-RNTI, from a network side device, determine SPS periodicities corresponding to the plurality of SPS configurations configured by the network side device for the terminal and/or SPS frequency resource configuration information corresponding to the plurality of SPS configurations configured by the network side device for the terminal, according to the one or more PDCCH orders scrambled by the SPS C-RNTI, and determine the plurality of SPS configurations according to the determined information corresponding to the plurality of SPS configurations; and
the transceiver is configured to receive and transmit data under the control of the processor;
wherein the plurality of SPS configurations are uplink SPS configurations, and
the processor is further configured to:
for each of the plurality of SPS configurations: transmit N consecutive padding BSRs having no data parts to the network side device over a resource of the SPS configuration to instruct the network side device to release the SPS configuration.

15. The terminal according to claim 14, wherein the processor is further configured to:
determine the SPS periodicities corresponding to the plurality of SPS configurations configured by the network side device for the terminal, via one or more RRC signalings before determining the plurality of SPS configurations according to the determined information, when determining the SPS frequency resource configuration information corresponding to the plurality of SPS configurations configured by the network side device for the terminal, according to the one or more PDCCH orders scrambled by the SPS C-RNTI.

16. The terminal according to claim 14, wherein the processor is further configured to:
determine the plurality of SPS configurations as SPS configurations to be used by the terminal when the plurality of SPS configurations do not overlap in a time domain; or
determine, an SPS configuration to be used by the terminal, from the plurality of SPS configurations according to a preset selection criterion when the plurality of SPS configurations overlap in the time domain.

17. The terminal according to claim 16, wherein the selection criterion is one of following criterions:
selecting a largest SPS frequency resource block;
selecting a smallest SPS frequency resource block; and
selecting an SPS frequency resource block according to data to be transmitted.

* * * * *